US012500691B2

(12) United States Patent
Wu et al.

(10) Patent No.: US 12,500,691 B2
(45) Date of Patent: Dec. 16, 2025

(54) CONSTELLATION SHAPING CONFIGURATION AND FEEDBACK

(71) Applicant: QUALCOMM Incorporated, San Diego, CA (US)

(72) Inventors: Liangming Wu, Beijing (CN); Changlong Xu, Beijing (CN); Jian Li, Shanghai (CN); Kangqi Liu, San Diego, CA (US); Kexin Xiao, Shanghai (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 301 days.

(21) Appl. No.: 18/245,144

(22) PCT Filed: Nov. 18, 2020

(86) PCT No.: PCT/CN2020/129733
§ 371 (c)(1),
(2) Date: Mar. 13, 2023

(87) PCT Pub. No.: WO2022/104587
PCT Pub. Date: May 27, 2022

(65) Prior Publication Data
US 2023/0361913 A1    Nov. 9, 2023

(51) Int. Cl.
*H04L 1/00*    (2006.01)
*H04L 27/34*    (2006.01)

(52) U.S. Cl.
CPC .......... *H04L 1/0042* (2013.01); *H04L 1/0075* (2013.01); *H04L 27/3411* (2013.01)

(58) Field of Classification Search
CPC ... H04L 1/0042; H04L 1/0075; H04L 27/3411
See application file for complete search history.

(56) References Cited

U.S. PATENT DOCUMENTS 10,396,899 B1 *  8/2019  Kim ..................... H04B 10/541
10,530,490 B1 *  1/2020  Vassilieva .......... H04B 10/5161
(Continued)

FOREIGN PATENT DOCUMENTS

CN        109391380 A        2/2019
CN        110959262 A        4/2020
WO    WO-2021105548 A1 *  6/2021    ........... H04L 1/0057

OTHER PUBLICATIONS

International Search Report and Written Opinion—PCT/CN2020/129733—ISA/EPO—Aug. 9, 2021.
(Continued)

*Primary Examiner* — Shah M Rahman
(74) *Attorney, Agent, or Firm* — Holland & Hart LLP

(57) ABSTRACT

Methods, systems, and devices for wireless communications are described. A user equipment (UE) may receive, from a base station, a configuration indicating a set of encoding parameters corresponding to a constellation shaping encoding process. The UE may calculate a number of bits of a first subset of a source bit stream, and the first subset of the source bit stream may include or encompass an input to a distribution matcher. The UE may apply, to the first subset, a distribution matcher parameter based on the set of encoding parameters. The UE may calculate a number of bits of a second subset of the source bit stream, and the second subset of the source bit stream may be concatenated with an output bit stream of the distribution matcher as an input to a channel encoder. The UE may signal the source bit stream to the base station.

28 Claims, 16 Drawing Sheets

(56) References Cited

U.S. PATENT DOCUMENTS

| | | | | |
|---|---|---|---|---|
| 2017/0331662 A1* | 11/2017 | Sun | .................... | H04J 11/004 |
| 2019/0052509 A1* | 2/2019 | Krishnan | .............. | H04L 1/0043 |
| 2020/0396027 A1* | 12/2020 | Zhang | .................... | H04L 1/189 |
| 2021/0250143 A1* | 8/2021 | Lee | ........................ | H04L 5/0048 |
| 2022/0014411 A1* | 1/2022 | Baligh | ................. | H04L 1/0025 |
| 2023/0389018 A1* | 11/2023 | Nimbalker | .......... | H04W 72/232 |

OTHER PUBLICATIONS

ZTE: "Discussion on DL 1024QAM for NR FR1", 3GPP TSG RAN WG1 #103-e, R1-2007977, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020, XP051946553, Nov. 13, 2020, 16 Pages, Retrieved on Oct. 24, 2020, Section 3, Part 3, Section 3, pp. 7 and 8, Figure 5.

* cited by examiner

CONSTELLATION SHAPING CONFIGURATION AND FEEDBACK

CROSS REFERENCE

The present application is a 371 national stage filing of International PCT Application No. PCT/CN2020/129733 by W U et al. entitled "CONSTELLATION SHAPING CONFIGURATION AND FEEDBACK," filed Nov. 18, 2020, which is assigned to the assignee hereof, and which is expressly incorporated by reference in its entirety herein.

FIELD OF TECHNOLOGY

The following relates to wireless communications, including constellation shaping configuration and feedback.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Information transmitted between network nodes may be encoded to improve the reliability of the transmitted information. For example, an encoding scheme may provide redundancy, which may be used to correct errors that result from the transmission environment (e.g., path loss, obstacles, etc.). Current techniques for encoding may be improved.

SUMMARY

The described techniques relate to improved methods, systems, devices, and apparatuses that support constellation shaping configuration and feedback. Generally, the described techniques provide for constellation shaping and signaling techniques for configuring a user equipment (UE) for constellation shaping.

For example, a UE may receive, from a base station, a configuration indicating a set of encoding parameters corresponding to a constellation shaping encoding process. The UE may calculate, based on the set of encoding parameters, a number of bits of a first subset of a source bit stream, and the first subset of the source bit stream may include or encompass an input to a distribution matcher of the constellation shaping encoding process. The UE may apply, to the first subset of the source bit stream and at the distribution matcher, a distribution matcher parameter based on the set of encoding parameters. The UE may calculate, based on the set of encoding parameters, a number of bits of a second subset of the source bit stream, and the second subset of the source bit stream may be concatenated with an output bit stream of the distribution matcher as an input to a channel encoder. The UE may communicate signaling with the base station, and the signaling may include the source bit stream.

A method for wireless communication at a UE is described. The method may include receiving, from a base station, a configuration indicating a set of encoding parameters corresponding to a constellation shaping encoding process, calculating, based on the set of encoding parameters, a number of bits of a first subset of a source bit stream, where the first subset of the source bit stream includes an input to a distribution matcher of the constellation shaping encoding process, applying, to the first subset of the source bit stream and at the distribution matcher, a distribution matcher parameter based on the set of encoding parameters, calculating, based on the set of encoding parameters, a number of bits of a second subset of the source bit stream, where the second subset of the source bit stream is concatenated with an output bit stream of the distribution matcher as an input to a channel encoder, and communicating signaling with the base station including the source bit stream.

An apparatus for wireless communication at a UE is described. The apparatus may include a processor, memory in electronic communication with the processor, and instructions stored in the memory. The instructions may be executable by the processor to cause the apparatus to receive, from a base station, a configuration indicating a set of encoding parameters corresponding to a constellation shaping encoding process, calculate, based on the set of encoding parameters, a number of bits of a first subset of a source bit stream, where the first subset of the source bit stream includes an input to a distribution matcher of the constellation shaping encoding process, apply, to the first subset of the source bit stream and at the distribution matcher, a distribution matcher parameter based on the set of encoding parameters, calculate, based on the set of encoding parameters, a number of bits of a second subset of the source bit stream, where the second subset of the source bit stream is concatenated with an output bit stream of the distribution matcher as an input to a channel encoder, and communicate signaling with the base station including the source bit stream.

Another apparatus for wireless communication at a UE is described. The apparatus may include means for receiving, from a base station, a configuration indicating a set of encoding parameters corresponding to a constellation shaping encoding process, means for calculating, based on the set of encoding parameters, a number of bits of a first subset of a source bit stream, where the first subset of the source bit stream includes an input to a distribution matcher of the constellation shaping encoding process, means for applying, to the first subset of the source bit stream and at the distribution matcher, a distribution matcher parameter based on the set of encoding parameters, means for calculating, based on the set of encoding parameters, a number of bits of a second subset of the source bit stream, where the second subset of the source bit stream is concatenated with an output bit stream of the distribution matcher as an input to a channel encoder, and means for communicating signaling with the base station including the source bit stream.

A non-transitory computer-readable medium storing code for wireless communication at a UE is described. The code may include instructions executable by a processor to receive, from a base station, a configuration indicating a set of encoding parameters corresponding to a constellation shaping encoding process, calculate, based on the set of encoding parameters, a number of bits of a first subset of a source bit stream, where the first subset of the source bit stream includes an input to a distribution matcher of the constellation shaping encoding process, apply, to the first subset of the source bit stream and at the distribution matcher, a distribution matcher parameter based on the set of encoding parameters, calculate, based on the set of encoding parameters, a number of bits of a second subset of the source bit stream, where the second subset of the source bit stream is concatenated with an output bit stream of the distribution matcher as an input to a channel encoder, and communicate signaling with the base station including the source bit stream.

Some examples of the method, apparatuses, and non-transitory computer-readable medium described herein may further include operations, features, means, or instructions for transmitting, to the base station, an indication of an index value corresponding to the set of encoding parameters, where the configuration indicating the set of encoding parameters may be based on the indication of the index value.

Some examples of the method, apparatuses, and non-transitory computer-readable medium described herein may further include operations, features, means, or instructions for transmitting, to the base station, an indication of the distribution matcher parameter, where the configuration indicating the set of encoding parameters may be based on the indication of the distribution matcher parameter.

Some examples of the method, apparatuses, and non-transitory computer-readable medium described herein may further include operations, features, means, or instructions for receiving, from the base station, a message requesting one or more of the set of encoding parameters from the UE.

In some examples of the method, apparatuses, and non-transitory computer-readable medium described herein, the configuration indicating the set of encoding parameters includes an index to a lookup table including the set of encoding parameters.

In some examples of the method, apparatuses, and non-transitory computer-readable medium described herein, the set of encoding parameters includes a first parameter indicating a ratio of a total number of bits of the source bit stream to a total number of symbols corresponding to a modulated bit stream, a second parameter indicating a channel encoding rate, a third parameter indicating the distribution matcher parameter, or any combination thereof.

In some examples of the method, apparatuses, and non-transitory computer-readable medium described herein, the set of encoding parameters includes any pair of the first parameter, the second parameter, or the third parameter.

In some examples of the method, apparatuses, and non-transitory computer-readable medium described herein, the set of encoding parameters includes an encoding parameter corresponding to a wideband frequency band and an encoding parameter corresponding to a subband frequency band.

In some examples of the method, apparatuses, and non-transitory computer-readable medium described herein, the configuration indicating the set of encoding parameters includes radio resource control (RRC) signaling.

In some examples of the method, apparatuses, and non-transitory computer-readable medium described herein, the configuration indicating the set of encoding parameters includes downlink control information (DCI) signaling or a medium access control control element (MAC-CE) signaling.

In some examples of the method, apparatuses, and non-transitory computer-readable medium described herein, the distribution matcher corresponds to a constant composition distribution matcher (CCDM) or a prefix-free code distribution matcher (PCDM).

A method for wireless communication at a base station is described. The method may include transmitting, to a UE, a configuration indicating a set of encoding parameters corresponding to a constellation shaping encoding process, where the set of encoding parameters indicate a number of bits of a first subset of a source bit stream and a number of bits of a second subset of the source bit stream, where the first subset of the source bit stream includes an input to a distribution matcher of the constellation shaping encoding process, and where the second subset of the source bit stream is concatenated with an output bit stream of the distribution matcher as an input to a channel encoder and communicating signaling with the UE including the source bit stream.

An apparatus for wireless communication at a base station is described. The apparatus may include a processor, memory in electronic communication with the processor, and instructions stored in the memory. The instructions may be executable by the processor to cause the apparatus to transmit, to a UE, a configuration indicating a set of encoding parameters corresponding to a constellation shaping encoding process, where the set of encoding parameters indicate a number of bits of a first subset of a source bit stream and a number of bits of a second subset of the source bit stream, where the first subset of the source bit stream includes an input to a distribution matcher of the constellation shaping encoding process, and where the second subset of the source bit stream is concatenated with an output bit stream of the distribution matcher as an input to a channel encoder and communicate signaling with the UE including the source bit stream.

Another apparatus for wireless communication at a base station is described. The apparatus may include means for transmitting, to a UE, a configuration indicating a set of encoding parameters corresponding to a constellation shaping encoding process, where the set of encoding parameters indicate a number of bits of a first subset of a source bit stream and a number of bits of a second subset of the source bit stream, where the first subset of the source bit stream includes an input to a distribution matcher of the constellation shaping encoding process, and where the second subset of the source bit stream is concatenated with an output bit stream of the distribution matcher as an input to a channel encoder and means for communicating signaling with the UE including the source bit stream.

A non-transitory computer-readable medium storing code for wireless communication at a base station is described. The code may include instructions executable by a processor to transmit, to a UE, a configuration indicating a set of encoding parameters corresponding to a constellation shaping encoding process, where the set of encoding parameters indicate a number of bits of a first subset of a source bit stream and a number of bits of a second subset of the source bit stream, where the first subset of the source bit stream includes an input to a distribution matcher of the constellation shaping encoding process, and where the second subset of the source bit stream is concatenated with an output bit stream of the distribution matcher as an input to a channel encoder and communicate signaling with the UE including the source bit stream.

Some examples of the method, apparatuses, and non-transitory computer-readable medium described herein may further include operations, features, means, or instructions for receiving, from the UE, an indication of an index value corresponding to the set of encoding parameters, where the configuration indicating the set of encoding parameters may be based on the indication of the index value.

Some examples of the method, apparatuses, and non-transitory computer-readable medium described herein may further include operations, features, means, or instructions for receiving, from the UE, an indication of a distribution matcher parameter, where the configuration indicating the set of encoding parameters may be based on the indication of the distribution matcher parameter.

Some examples of the method, apparatuses, and non-transitory computer-readable medium described herein may further include operations, features, means, or instructions for transmitting, to the UE, a message requesting one or more of the set of encoding parameters from the UE.

In some examples of the method, apparatuses, and non-transitory computer-readable medium described herein, the configuration indicating the set of encoding parameters includes an index to a lookup table including the set of encoding parameters.

In some examples of the method, apparatuses, and non-transitory computer-readable medium described herein, the set of encoding parameters includes a first parameter indicating a ratio of a total number of bits of the source bit stream to a total number of symbols corresponding to a modulated bit stream, a second parameter indicating a channel encoding rate, a third parameter indicating a distribution matcher parameter, or any combination thereof.

In some examples of the method, apparatuses, and non-transitory computer-readable medium described herein, the set of encoding parameters includes any pair of the first parameter, the second parameter, or the third parameter.

In some examples of the method, apparatuses, and non-transitory computer-readable medium described herein, the set of encoding parameters includes an encoding parameter corresponding to a wideband frequency band and an encoding parameter corresponding to a subband frequency band.

In some examples of the method, apparatuses, and non-transitory computer-readable medium described herein, the configuration indicating the set of encoding parameters includes RRC signaling.

In some examples of the method, apparatuses, and non-transitory computer-readable medium described herein, the configuration indicating the set of encoding parameters includes DCI signaling or medium access control control element (MAC-CE) signaling.

In some examples of the method, apparatuses, and non-transitory computer-readable medium described herein, the distribution matcher corresponds to a constant composition distribution matcher (CCDM) or a prefix-free code distribution matcher (PCDM).

DETAILED DESCRIPTION

In some wireless communications systems, a network node (e.g., a user equipment (UE), a base station, or another wireless device) may encode source information (e.g., packets) and transmit the encoded information to a destination node. Encoding the source information may improve the reliability with which the destination node may recover the original source information (e.g., through redundancy or other mechanisms), which may improve system reliability. The source information may be represented by a set of source symbols, and based on the operative encoding scheme, an encoder may generate a corresponding set of encoded symbols (which may be transmitted by a transmitting device and received by a receiving device).

Wireless devices may employ the use of constellation shaping as part of the signal modulation process. Some techniques for constellation shaping employ a distribution matcher (DM) that applies distribution matching parameters to a bit sequence. However, such distribution matching parameters may be preconfigured, static, or fail to adapt to dynamic network conditions (e.g., the fading channel effect). In particular, a network node may not be configured with one or more distribution matching parameters, or the network node may not signal one or more distribution matching parameters to the destination node. Aspects of the present disclosure provide for constellation shaping and techniques for configuring, determining, and applying encoding parameters for constellation shaping.

Various aspects of the present disclosure provide techniques for indicating encoding parameters in the context of signal modulation, a distribution matcher, or constellation shaping. For example, a UE may receive a configuration indicating a set of encoding parameters corresponding to a constellation shaping encoding process, calculate a number of bits of a first subset of a source bit stream based on the set of encoding parameters, and apply a distribution matcher parameter to the first subset of the source bit stream based on the set of encoding parameters. The UE may calculate, based on the set of encoding parameters, a number of bits of a second subset of the source bit stream, and the second subset of the source bit stream may be concatenated with an output bit stream of the distribution matcher as an input to a channel encoder. The UE may signal the source bit stream to the base station based on the signaling with the base station, and the signaling may include the source bit stream.

Aspects of the disclosure are initially described in the context of wireless communications systems. Aspects of the disclosure are further described in the context of process flows. Aspects of the disclosure are further illustrated by and described with reference to apparatus diagrams, system diagrams, and flowcharts that relate to constellation shaping configuration and feedback.

Figure 1:
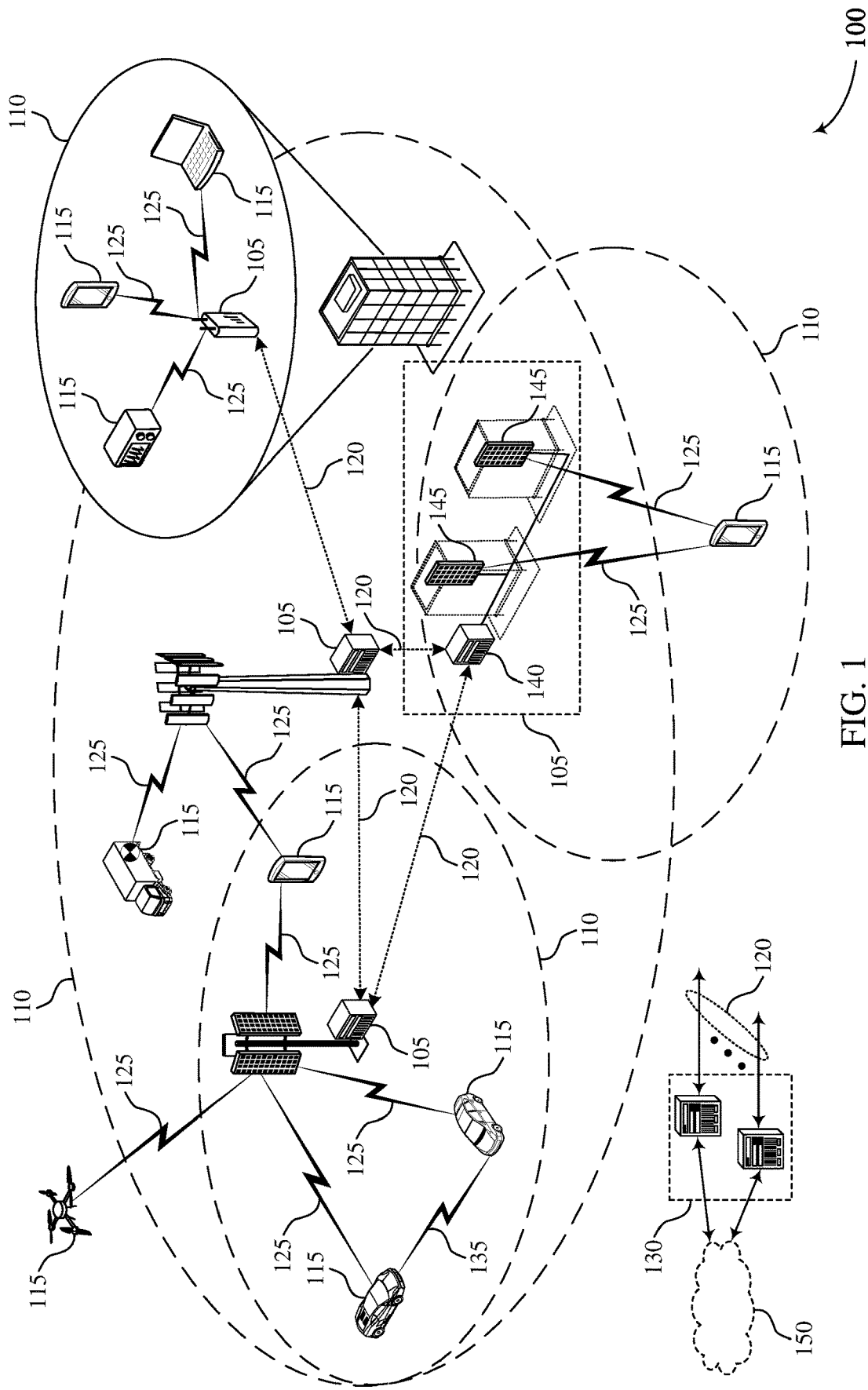
FIG. 1 illustrates an example of a wireless communications system that supports constellation shaping configuration and feedback in accordance with aspects of the present disclosure.

FIG. 1 illustrates an example of a wireless communications system 100 that supports constellation shaping configuration and feedback in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive, from a base station 105, a configuration indicating a set of encoding parameters corresponding to a constellation shaping encoding process. The UE 115 may calculate, based on the set of encoding parameters, a number of bits of a first subset of a source bit stream, and the first subset of the source bit stream may include or encompass an input to a distribution matcher of the constellation shaping encoding process. The UE 115 may apply, to the first subset of the source bit stream and at the distribution matcher, a distribution matcher parameter based on the set of encoding parameters. The UE 115 may calculate, based on the set of encoding parameters, a number of bits of a second subset of the source bit stream, and the second subset of the source bit stream may be concatenated with an output bit stream of the distribution matcher as an input to a channel encoder. The UE 115 may communicate signaling with the base station 105, and the signaling may include the source bit stream.

Figure 2:
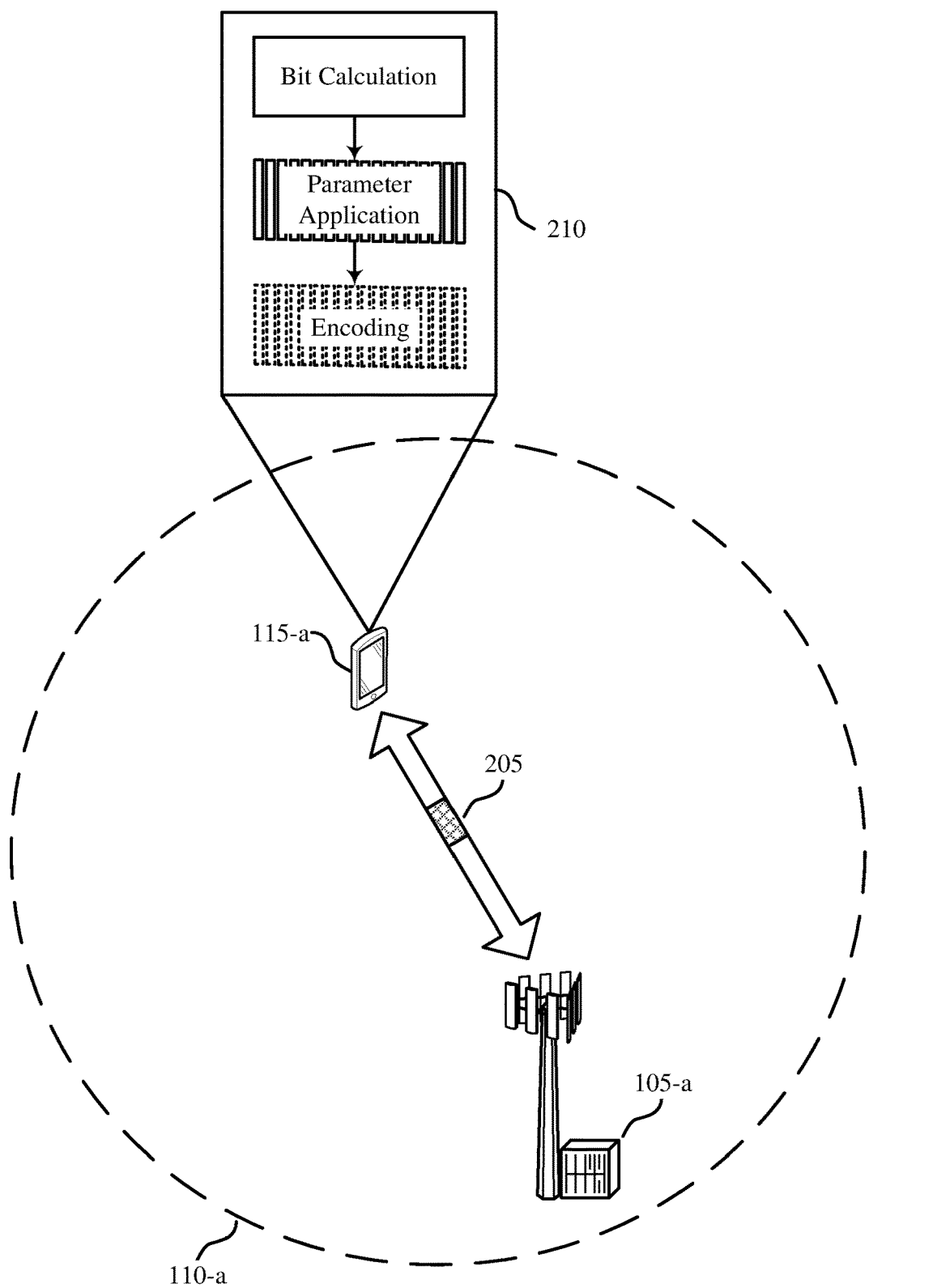
FIG. 2 illustrates an example of a wireless communications that supports constellation shaping configuration and feedback in accordance with aspects of the present disclosure.

FIG. 2 illustrates an example of a wireless communications system 200 that supports constellation shaping configuration and feedback in accordance with aspects of the present disclosure. In some examples, the wireless communications system 200 may implement aspects of wireless communications system 100. For example, the wireless communications system 200 may include base station 105-*a* and UE 115-*a*, which may be examples of UEs 115 and base stations 105 described herein. Base station 105-*a* may be associated with coverage area 110-*a*.

The UE 115-*a* may be configured for or otherwise considered a transmitting device performing a wireless transmission to base station 105-*a*, which may be configured for or otherwise considered a receiving device. However, it is to be understood that the UE 115-*a* may implement various aspects of the described techniques when acting as or otherwise configured as a receiving device performing a wireless transmission with the base station 105-*a*, which would be configured or otherwise acting as a transmitting device.

Some devices in a wireless network may employ the use of constellation shaping as part of the signal modulation process. To approach the Shannon capacity, the transmission of quadrature amplitude modulation may be non-uniformly distributed. For instance, uniform quadrature amplitude modulation may be 1.53 dB away from a capacity line asymptotically. In some examples, Gaussian distribution of constellation symbols may be achieved using two methods. In a first example, a geometric constellation shaping may be achieved using equal probability constellation with Gaussian amplitude distribution. In a second example, a probabilistic constellation shaping may be achieved using uniform quadrature amplitude modulation with non-equal probability of constellation.

Some techniques for constellation shaping may employ a distribution matcher that applies distribution matching parameters to a bit sequence. A distribution matcher may include software, hardware, or any combination of components operable to apply one or more parameters to a sequence of bits to achieve an output sequence of bits for purposes of constellation shaping as described herein. Some constellation shaping techniques may not consider the fading channel effect, which can result in a SNR variations (e.g., a 30-40 dB SNR variation). Additionally, some techniques may not support signaling or other mechanisms for conveying or configuring constellation shaping encoding parameters, and such systems may not adapt to dynamic network conditions. That is, in some techniques, the distribution matching parameters may be statically configured, which may increase latency and decrease signal reliability. For example, some techniques may use a modulation and coding scheme (MCS) table and an allocated resource to configure the distribution matching parameters and/or the number of bits in a subset of a bit stream, which may decrease the efficiency of the signal modulation process.

As depicted herein, in some examples, a coded modulation scheme may be implemented at a transmitter and a receiver. At the transmitter, the concatenation of a distribution matcher and a systematic binary encoder may perform probabilistic signal shaping and channel coding. At the receiver, the output of a bitwise demapper may be inputted into a binary decoder. In some examples, no iterative demapping may be performed. The transmitter and receiver may achieve rate adaption by adjusting the input distribution and the transmission power. In some examples, the subband dependent constellation shaping described herein may be applied to bipolar amplitude shift keying (ASK) constellations with equidistant signal points and may be directly applicable to two-dimensional quadrature amplitude modulation.

In some examples, data of K length information bits may be partitioned into 2 parts. For instance, at 210, a transmitter (e.g., UE 115-*a*) may partition K length information bits into a first part (e.g., Part 1) including k–i bits and a second part (e.g., Part 2) including i bits. A distribution matcher may transform the first part (e.g., Part 1) bit sequence into m-length amplitude sequence. The transmitter may then transform each of the amplitude sequences into binary sequences using a b( ) function. For example, the transmitter may transform an M-array amplitude to generate $\log 2(M)$ *m binary bits using binary mapping. The transmitter may apply channel coding to the output of the distribution matcher and the second part (e.g., Part 2) including i information bits to create parity bits having length n. The second part (e.g., Part 2) including i information bits and bits outputted from the channel coding are concatenated into an m-length binary sequence. The transmitter may then multiply the concatenated sequence output bits with the amplitude output (e.g., the binary sequence corresponding to the output of the b( ) function), and may then modulate the information bits. Techniques that support a wireless device in selecting, indicating, or deriving channel shaping parameters may improve device throughput and reliability, and reduce system latency.

Some wireless devices in a wireless network may employ multiple parameters for constellation shaping and signal modulation. In some examples, the techniques described herein for configuring or deriving parameters for a constellation shaping may be applied to a constant composition distribution matcher (CCDM), a prefix-free code distribution matching (PDCM), or the like. Some parameters that may be used for constellation shaping include a parameter corresponding to a scheduling resource such as a quantity of time resources or frequency resources (which may be referred to as m), a parameter corresponding to a modulation order (which may be referred to as M), a parameter that indicates an overall efficiency (which may be referred to as $SE_O$)

$$\left(\text{e.g., } SE_O = \frac{\text{total \# of source bits}}{\text{total \# of symbols}}, SE_O = \frac{k}{m}\right),$$

a parameter indicating a channel encoder rate (which may be referred to as $R_c$)

$$\left(\text{e.g., } R_{DM} = \frac{\text{\# of input bits of } DM}{\text{\# of output symbols}}, R_{DM} = \frac{k-i}{m}\right),$$

a parameter indicating a distribution matcher (DM) rate (as referred to as $R_{DM}$)

$$\left(\text{e.g., } R_c = \frac{\text{input bits}}{\text{output bits}}, R_c = \frac{m * \log_2(M) + i}{m * \log_2(M) + 1}\right),$$

or a parameter corresponding to constellation distribution (which may be referred to as $P_{DM}$) (e.g., a parameter referred to as v in the context of a CCDM, a bits to symbols mapping table selection in the context of a PDCM). One or more parameters may be derived based on another parameter. For example, $R_{DM}$ may be derived based on $P_{DM}$, or $P_{DM}$ may be derived based on $R_{DM}$. In another example, "v" and "m" may be used to derive the number of input bits for a subset of bit stream (e.g., k–i bits, Part 1) based on the equation $B=B_1B_2 \ldots B_m:=b(S) b(A)$.

As described herein, a wireless device (e.g., a receiving device, transmitting device, a UE, a base station, etc.) may derive or otherwise determine a number of bits (e.g., a subset size) for a DM. For example, some devices may use an MCS value to calculate a number of input bits (as referred to as k), as the MCS value may indicate "M" and "$R_c$"). As described herein, multiple information branches may exist (e.g., two subsets, Part 1 and Part 2, k−i and i), so the wireless device may use two or more parameters to determine the number of bits per branch. As such, the wireless device may use at least two of $SE_O$, $R_c$, and ($R_{DM}$ or $P_{DM}$) to calculate the number of bits per subset. For example, the wireless device may be configured with $SE_O$ and $R_c$, $SE_O$ and $R_{DM}$, or $R_c$ and $P_{DM}$. In some cases, the wireless device may be configured with parameters for wideband operation, parameters for subband operation, or both. In some cases, the configuration 205 may include Table 1 or an indication of Table 1 as described herein.

TABLE 1

| Wideband Parameter | Subband Parameter |
|---|---|
| $R_c$ | $R_{DM}$ or $P_{DM}$ |
| $SE_O$ | $R_{DM}$ or $P_{DM}$ |

The configuration 205 may indicate an index value and UE 115-a may select a wideband parameter and/or a subband parameter based on the index value, or the configuration 205 may indicate a wideband parameter and/or a subband parameter.

In some cases, the configuration 205 may support a joint configuration of the parameters with an MCS. For example, the configuration 205 may include Table 2 or an indication of Table 2 as described herein.

TABLE 2

| MCS | Modulation Order | $P_{DM}(v)$ | $R_c$ |
|---|---|---|---|
| 0 | 2 | 16 | 0 |
| 1 | 4 | 16 | 0.01 |
| 2 | 4 | 64 | 0.02 |
| 3 | 8 | 256 | 0.002 |
| 4 | 8 | 64 | 0.01 |

As described herein, Table 2 illustrates an example wideband joint configuration of $P_{DM}$, $R_c$, and MCS for UE 115-a.

The configuration 205 may include Table 3 or an indication of Table 3 as described herein.

TABLE 3

| MCS | Modulation Order | $P_{DM}(v)$ | $R_c$ |
|---|---|---|---|
| 0 | 2 | 0 | 0.5 |
| 1 | 4 | 0, 0.02 | 0.5 |
| 2 | 4 | 0, 0.01 | 0.5 |
| 3 | 8 | 0, 0.02 | 0.6 |
| 4 | 8 | 0, 0.01 | 0.7 |

As described herein, Table 3 illustrates an example subband joint configuration of $P_{DM}$, $R_c$, and MCS for UE 115-a. As shown in Table 3, the $P_{DM}$ parameter may be indicated at the subband level. For example, Table 3 may support UE 115-a in calculating $\log_2[J]$ bits per subband, where J is the number of hypothesis of $P_{DM}$ per MCS.

The parameters described herein may be combined with any MCS table or row (e.g., a joint configuration). Table 4 illustrates an example MCS table, which may be altered to jointly configure parameters for constellation shaping.

TABLE 4

| MCS Index IMCS | Modulation Order Qm | Target Code Rate × [1024] R | Spectral Efficiency |
|---|---|---|---|
| 0 | 2 | 120 | 0.2344 |
| 1 | 2 | 193 | 0.377 |
| 2 | 2 | 308 | 0.6016 |
| 3 | 2 | 449 | 0.877 |
| 4 | 2 | 602 | 1.1758 |
| 5 | 2 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 4 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 6 | 682.5 | 5.332 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

The tables herein may be used by UE 115-a and base station 105-a in calculating a number of input bits and a number of output bits for constellation shaping and signal modulation. For example, UE 115-a may be configured (e.g., via the configuration 205, a control signal indicating an index of a configuration or table, a control signal indicating multiple parameters, etc.) with $R_c$, $R_{DM}$, $N_{RE}$=m, modulation order=m, and number of bits per resource element (RE)=$\log_2(M)$. In such an example, the number of output bits from the DM of UE 115-a is $N_{DM}$=m*($\log_2(M)$−1). It should be understood that "−1" may be used for ASK and "−2" may be used for QAM considering two dimensions. Continuing with the same example, Part 1 of information bits $K_1$=$\lfloor N_{DM}*R_{DM} \rfloor$, the total number of output bits $N_{total}$=m*$\log_2(M)$, the input bits for channel encoder $K_{total}$=$\lfloor N_{total}*R_c \rfloor$, and Part 2 information bits $K_2$=$K_{total}$−$N_{DM}$.

In another example, UE 115-a may be configured with SE, $R_{DM}$, $N_{RE}$=m, modulation order=M, and number of bits per RE=$\log_2(M)$. In such an example, the number of output bits from $N_{DM}$=m*($\log_2(M)$−1). It should be understood that "−1" may be used for ASK and "−2" may be used for QAM considering two dimensions. Continuing with the same example, Part 1 of information bits $K_1$=$\lfloor N_{DM}*R_{DM} \rfloor$, the total number of output bits $N_{total}$=m*$\log_2(M)$, the input bits for channel encoder $K_{total}$=$\lfloor N_{total}*SE \rfloor$, and Part 2 information bits $K_2$=$K_{total}$−$K_1$.

In yet another example, UE 115-a may communicate with base station 105-a on two subbands, and UE 115-a may be configured with $R_c$, $R_{DM1}$, $R_{DM2}$, $N_{RE1}$=$m_1$, $N_{RE2}$=$m_2$, modulation order=M, and number of bits per RE=$\log_2(M)$. In such an example, the number of output bits from DM1 is $N_{DM1}=m_1*(\log_2(M)-1)$, and the number of output bits from DM2 is $N_{DM2}=m_2*(\log_2(M)-1)$. It should be understood that "−1" may be used for ASK and "−2" may be used for QAM considering two dimensions. Continuing with the same example, Part 1 of information bits $K_{11}=\lfloor N_{DM1}*R_{DM1}\rfloor$, $K_{12}=\lfloor N_{DM2}*R_{DM2}\rfloor$, the total number of output bits $N_{total}=(m_1+m_2)*\log_2(M)$, the input bits for channel encoder $K_{total}=\lfloor N_{total}*R_c\rfloor$, and Part 2 information bits $K_2=K_{total}-N_{DM1}-N_{DM2}$.

In some cases, base station 105-a may trigger UE 115-a to report desired or suggested modulation order and related parameters (e.g., parameters for constellation shaping). In a first example (e.g., Option 1), UE 115-a may report parameters corresponding to an MCS table setting. For example, UE 115-a may report an MCS index that contains the desired parameters (i.e., similar to a channel quality indicator (CQI) design). If each MCS includes wideband and multiple subband parameters, then subband parameters may additionally be selected via signaling. If each MCS includes only one set of parameters, an MCS group can be defined and subband parameters may additionally be selected within the MCS group.

In a second example (e.g., Option 2), UE 115-a may provide base station 105-a with separate reports for different parameters (e.g., parameters for constellation shaping). For example, a part of a parameter may be triggered and reported. Base station 105-a may preconfigure a selected MCS, and only $P_{DM}$ may be allowed to be reported, and the other parameters (e.g., other parameters for constellation shaping) may follow the configuration indicated by the MCS. In some examples, UE 115-a may report the parameter "v" to base station 105-a in a channel state information (CSI) report. As described herein, the parameter "v" may control or otherwise affect the distribution for constellation shaping, or "v" may be associated with a mapping table for constellation shaping.

Figure 3:
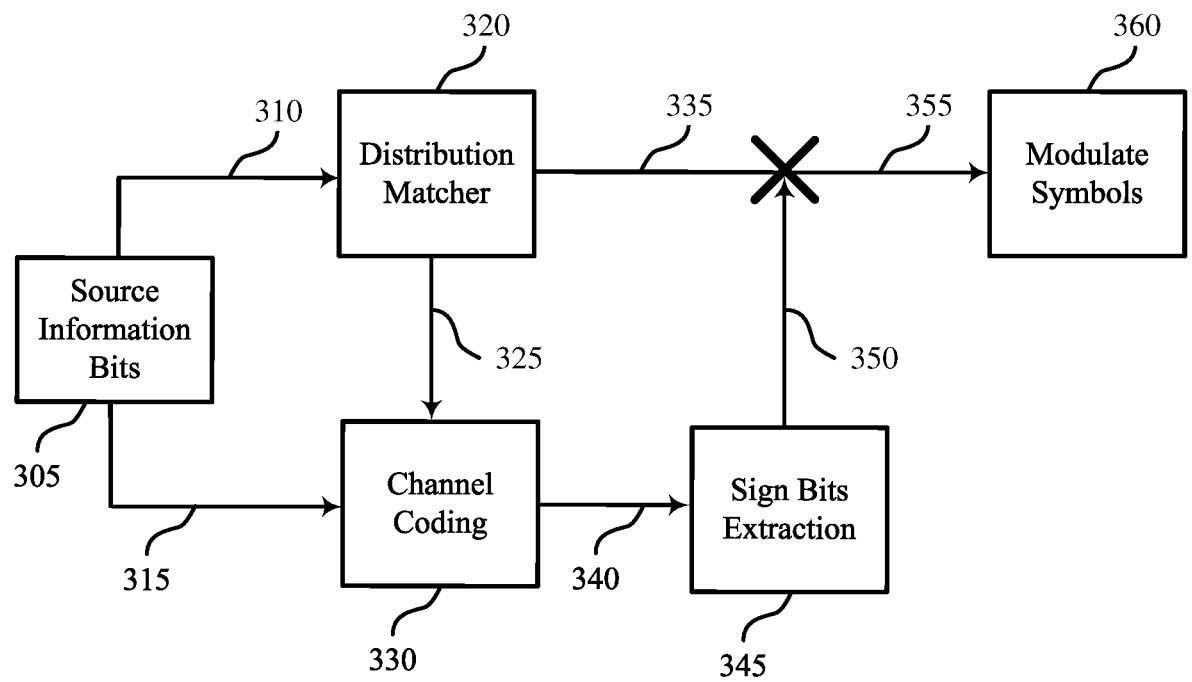
FIG. 3 illustrates an example of a process flow that supports constellation shaping configuration and feedback in accordance with aspects of the present disclosure.

FIG. 3 illustrates an example of a process flow 300 that supports constellation shaping configuration and feedback in accordance with aspects of the present disclosure. In some examples, the process flow 300 may implement aspects of wireless communications system 100 or wireless communications system 200. Process flow 300 may be implemented by a transmitting device (such as a base station 105 or a UE 115) and a receiving device (such as a base station 105 or a UE 115). In this example, the transmitting device may act as an input node and perform encoding, while the receiving device may act as an output node and perform decoding. In one example, a base station 105 may act as the input node and a UE 115 may act as the output node. In another example, a UE 115 may act as the input node while a base station 105 may act as the output node. In other examples, the communications may be between two UEs 115 or two base stations 105, or between any other quantity of nodes of the same or different types. The transmitting device may use an encoding scheme to implement constellation shaping and the receiving device may use a corresponding decoding scheme. In particular, the process flow 300 may be used to implement a signal modulation process, and the process flow 300 may utilize one or more configured parameters as described herein.

At 305, the transmitting device may identify a set of bits for a wireless transmission. In some examples, the set of bits may include a set of source bits. As one example, the transmitting device may identify K length information bits. In some cases, the set of source bits may be represented as B(0)~B(k−1). The transmitting device may additionally partition K length information bits into 2 parts or subsets. For instance, a transmitter (e.g., UE 115 or base station 105) may partition K length information bits into a first part (e.g., Part 1) including k−i bits and a second part (e.g., Part 2) including i bits.

At 310, the transmitting device may pass the first part (e.g., Part 1) including k−i bits to a distribution matcher. In some cases, the first part (e.g., Part 1) including k−i bits may be represented as B(i)~B(k−1).

At 315, the transmitting device may pass the second part (e.g., Part 2) including i bits to a channel encoder. In some cases, the second part (e.g., Part 2) including i bits may be represented as B(0)~B(i−1).

At 320, the transmitting device may apply, at the distribution matcher, a first encoding parameter set of a set of encoding parameter sets to a first subset of a bit stream (e.g., a first part including k−i bits represented as B(i)~B(k−1)). The distribution matcher may transform the first subset of the bit stream into m-length amplitude sequence.

At 335, the M-length amplitude sequence, which may be referred to as A(0)~A(m−1), may be passed to a multiplying component.

At 325, each element of the amplitude sequence may be transformed into binary sequence with a b(function. For example, an M-array amplitude to binary mapping, which generates $\log_2(M)*m$ binary bits. The binary sequence may be referred to as B(A(0)~b(A(m−1))).

At 330, an encoder may receive the binary sequence from 325 and the second part from 315 (e.g., a subset of information bits) to create a sequence of parity bits having length n.

At 340, the sequence of parity bits and the second part from 315 (e.g., i information bits) may be concatenated into a binary sequence of length m, which may be represented as C(0)~C(n−1).

At 345, the sequence of parity bits from 340 may have sign bits extracted, and the resulting sequence of bits may be represented as S(0)~S(m−1).

At 350, the resulting sequence of bits may be passed to the multiplying components. The multiplying components may multiply the amplitude out from 335 with the resulting sequence from 350.

At 355, the transmitter may modulate symbols based on the result of multiplying the amplitude out from 335 with the resulting sequence from 350.

Figure 4:
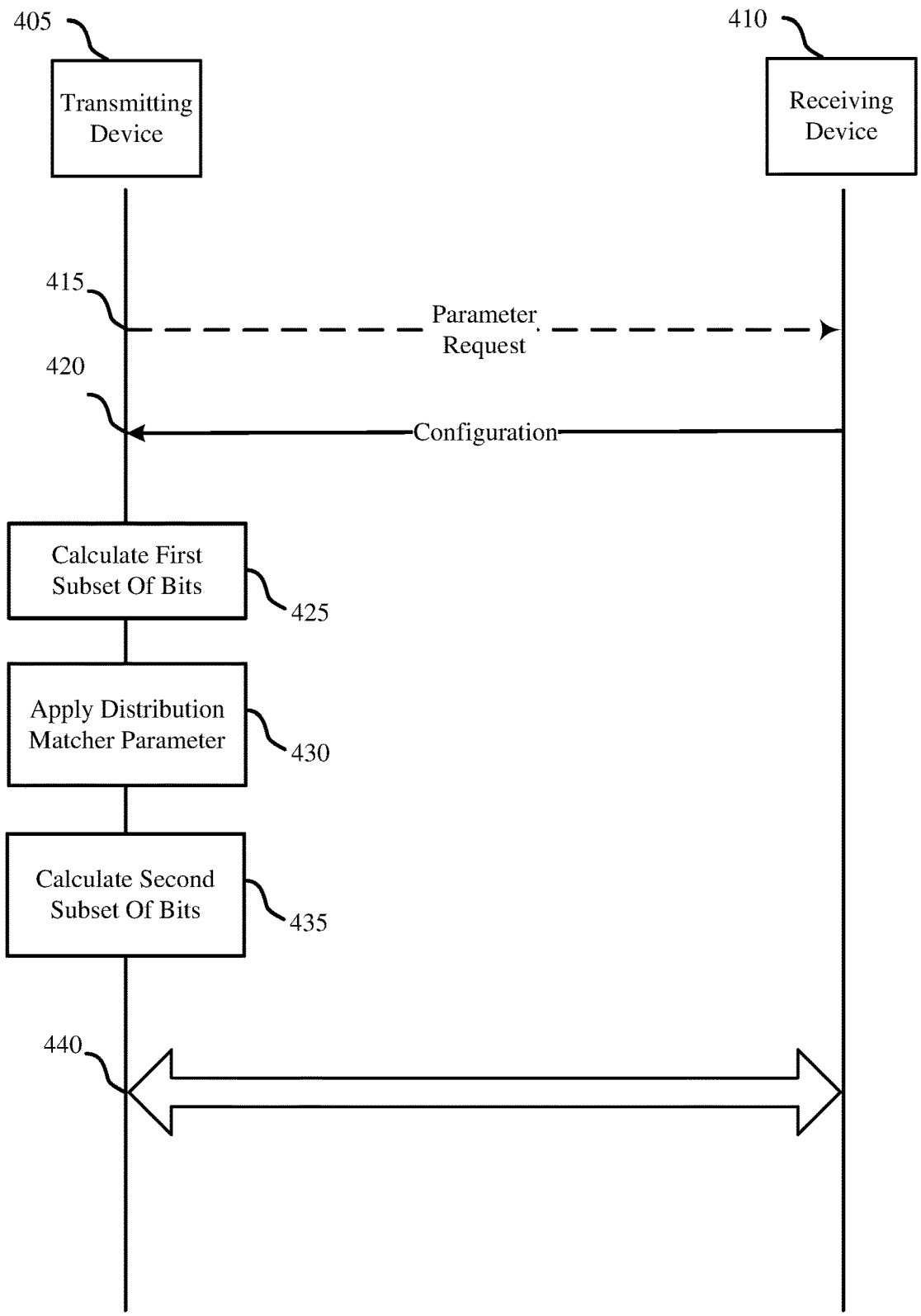
FIG. 4 illustrates an example of a process flow that supports constellation shaping configuration and feedback in accordance with aspects of the present disclosure.

FIG. 4 illustrates an example of a process flow 400 that supports constellation shaping configuration and feedback in accordance with aspects of the present disclosure. In some examples, the process flow 400 may implement aspects of wireless communications systems 100 or 200. The process flow 400 includes a transmitting device 405 and a receiving device 410, which may be examples of the corresponding devices described with reference to FIG. 1 through 3. Process flow 400 may be implemented by a transmitting device 405 (such as a base station 105 or a UE 115) and a receiving device 410 (such as a base station 105 or a UE 115). The receiving device 405 may be configured with parameters for constellation shaping, and the receiving device 405 may communicate with the transmitting device 410 based on the configured parameters. Alternative examples of the following may be implemented, where some steps are performed in a different order than described or are not performed at all. In some cases, steps may include additional features not mentioned below, or further steps may be added.

At 415, the receiving device 405 may transmit a parameter request to the receiving device 410. In some cases, the parameter request may include an index value corresponding to a set of encoding parameters and/or an indication of a distribution matcher parameter.

At 420, the transmitting device may receive a configuration indicating a set of encoding parameters corresponding to a constellation shaping encoding process. In some cases, the configuration may be based on the parameter request.

At 425, the transmitting device 405 may calculate, based on the set of encoding parameters, a number of bits of a first subset of a source bit stream, where the first subset of the source bit stream includes an input to a distribution matcher of the constellation shaping encoding process.

At 430, the transmitting device 405 may apply, to the first subset of the source bit stream and at the distribution matcher, a distribution matcher parameter based on the set of encoding parameters.

At 435, the transmitting device 405 may calculate, based on the set of encoding parameters, a number of bits of a second subset of the source bit stream, where the second subset of the source bit stream is concatenated with an output bit stream of the distribution matcher as an input to a channel encoder.

At 440, the transmitting device 405 may communicate signaling with the receiving device 410. For example, the transmitting device 405 may signal the source bit stream based on the output of the channel encoder.

Figure 5:
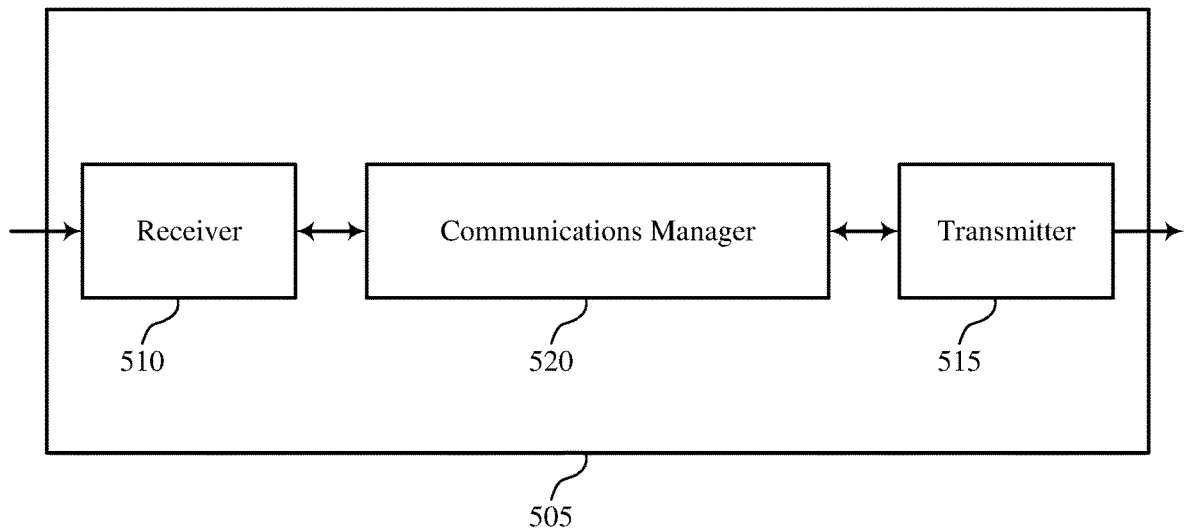
FIGS. 5 and 6 show block diagrams of devices that support constellation shaping configuration and feedback in accordance with aspects of the present disclosure.

FIG. 5 shows a block diagram 500 of a device 505 that supports constellation shaping configuration and feedback in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to constellation shaping configuration and feedback). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to constellation shaping configuration and feedback). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of constellation shaping configuration and feedback as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving, from a base station, a configuration indicating a set of encoding parameters corresponding to a constellation shaping encoding process. The communications manager 520 may be configured as or otherwise support a means for calculating, based on the set of encoding parameters, a number of bits of a first subset of a source bit stream, where the first subset of the source bit stream includes an input to a distribution matcher of the constellation shaping encoding process. The communications manager 520 may be configured as or otherwise support a means for applying, to the first subset of the source bit stream and at the distribution matcher, a distribution matcher parameter based on the set of encoding parameters. The communications manager 520 may be configured as or otherwise support a means for calculating, based on the set of encoding parameters, a number of bits of a second subset of the source bit stream, where the second subset of the source bit stream is concatenated with an output bit stream of the distribution matcher as an input to a channel encoder. The communications manager 520 may be configured as or otherwise support a means for communicating signaling with the base station including the source bit stream.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, or more efficient utilization of communication resources based on being configured with constellation mapping parameters.

Figure 6:
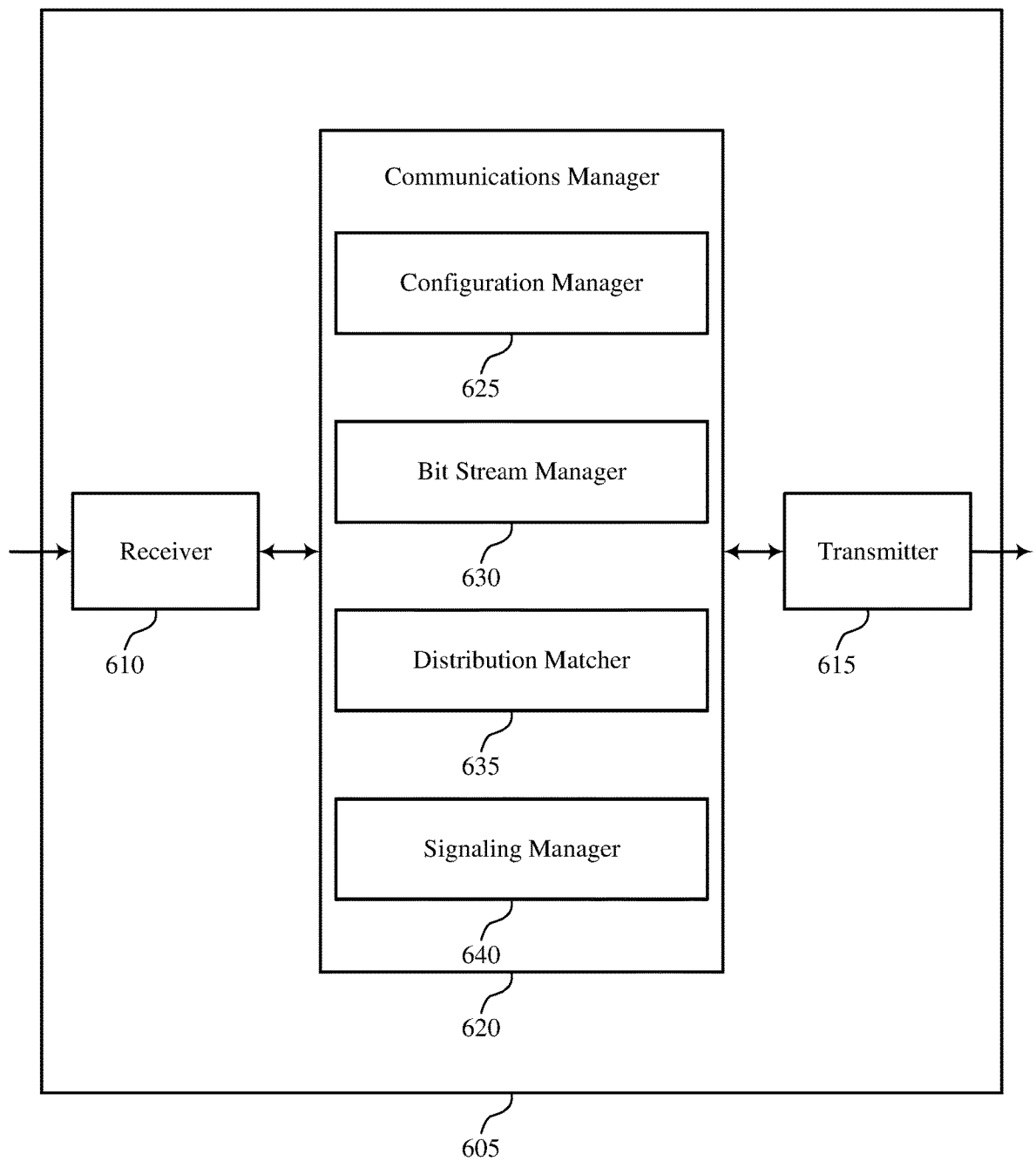

FIG. 6 shows a block diagram 600 of a device 605 that supports constellation shaping configuration and feedback in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to constellation shaping configuration and feedback). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to constellation shaping configuration and feedback). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of constellation shaping configuration and feedback as described herein. For example, the communications manager 620 may include a configuration manager 625, a bit stream manager 630, a distribution matcher 635, a signaling manager 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The configuration manager 625 may be configured as or otherwise support a means for receiving, from a base station, a configuration indicating a set of encoding parameters corresponding to a constellation shaping encoding process. The bit stream manager 630 may be configured as or otherwise support a means for calculating, based on the set of encoding parameters, a number of bits of a first subset of a source bit stream, where the first subset of the source bit stream includes an input to a distribution matcher of the constellation shaping encoding process. The distribution matcher 635 may be configured as or otherwise support a means for applying, to the first subset of the source bit stream and at the distribution matcher, a distribution matcher parameter based on the set of encoding parameters. The bit stream manager 630 may be configured as or otherwise support a means for calculating, based on the set of encoding parameters, a number of bits of a second subset of the source bit stream, where the second subset of the source bit stream is concatenated with an output bit stream of the distribution matcher as an input to a channel encoder. The signaling manager 640 may be configured as or otherwise support a means for communicating signaling with the base station including the source bit stream.

Figure 7:
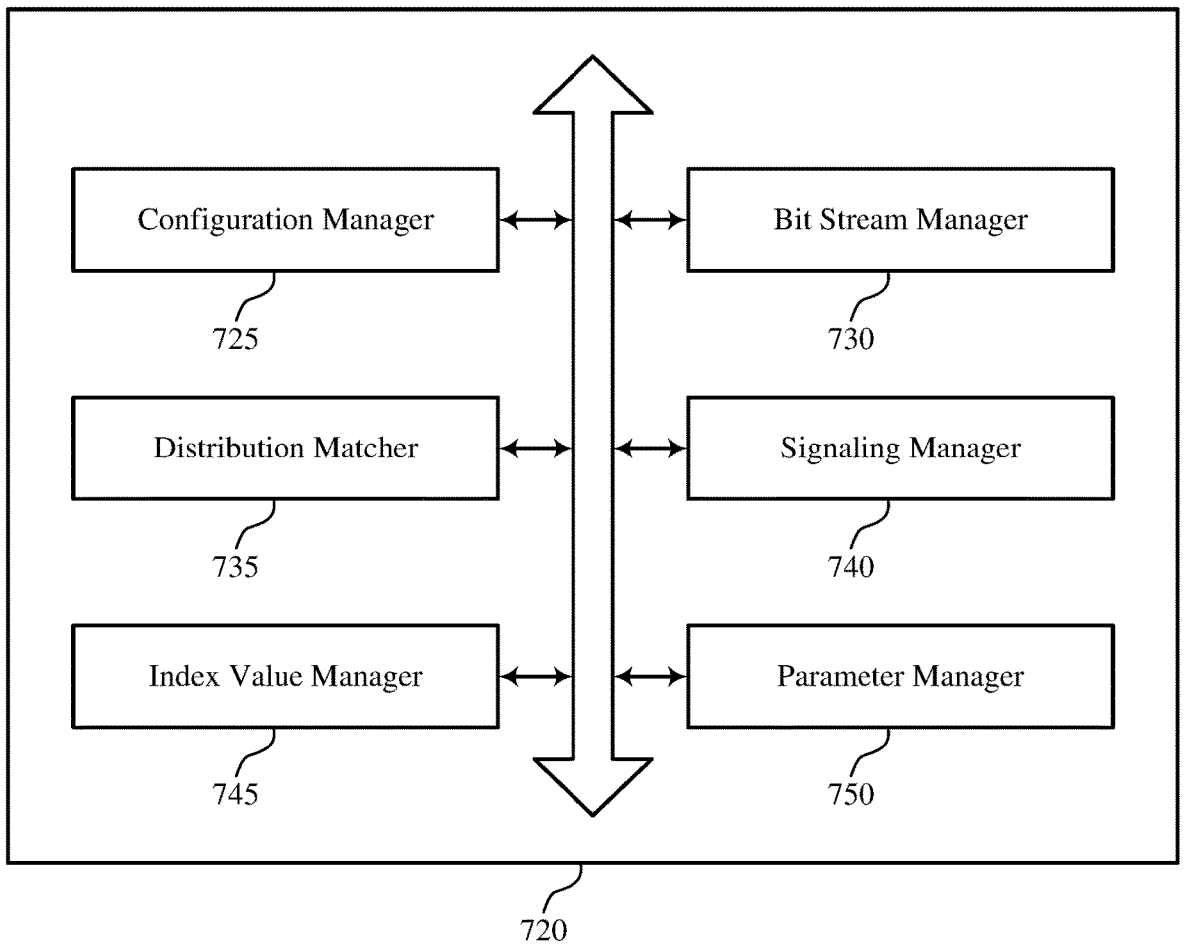
FIG. 7 shows a block diagram of a communications manager that supports constellation shaping configuration and feedback in accordance with aspects of the present disclosure.

FIG. 7 shows a block diagram 700 of a communications manager 720 that supports constellation shaping configuration and feedback in accordance with aspects of the present disclosure. The communications manager 720 may be an example of aspects of a communications manager 520, a communications manager 620, or both, as described herein. The communications manager 720, or various components thereof, may be an example of means for performing various aspects of constellation shaping configuration and feedback as described herein. For example, the communications manager 720 may include a configuration manager 725, a bit stream manager 730, a distribution matcher 735, a signaling manager 740, an index value manager 745, a parameter manager 750, or any combination thereof. Each of these components may communicate, directly or indirectly, with one another (e.g., via one or more buses).

The communications manager 720 may support wireless communication at a UE in accordance with examples as disclosed herein. The configuration manager 725 may be configured as or otherwise support a means for receiving, from a base station, a configuration indicating a set of encoding parameters corresponding to a constellation shaping encoding process. The bit stream manager 730 may be configured as or otherwise support a means for calculating, based on the set of encoding parameters, a number of bits of a first subset of a source bit stream, where the first subset of the source bit stream includes an input to a distribution matcher of the constellation shaping encoding process. The distribution matcher 735 may be configured as or otherwise support a means for applying, to the first subset of the source bit stream and at the distribution matcher, a distribution matcher parameter based on the set of encoding parameters. In some examples, the bit stream manager 730 may be configured as or otherwise support a means for calculating, based on the set of encoding parameters, a number of bits of a second subset of the source bit stream, where the second subset of the source bit stream is concatenated with an output bit stream of the distribution matcher as an input to a channel encoder. The signaling manager 740 may be configured as or otherwise support a means for communicating signaling with the base station including the source bit stream.

In some examples, the index value manager 745 may be configured as or otherwise support a means for transmitting, to the base station, an indication of an index value corresponding to the set of encoding parameters, where the configuration indicating the set of encoding parameters is based on the indication of the index value.

In some examples, the parameter manager 750 may be configured as or otherwise support a means for transmitting, to the base station, an indication of the distribution matcher parameter, where the configuration indicating the set of encoding parameters is based on the indication of the distribution matcher parameter.

In some examples, the configuration manager 725 may be configured as or otherwise support a means for receiving, from the base station, a message requesting one or more of the set of encoding parameters from the UE.

In some examples, the configuration indicating the set of encoding parameters includes an index to a lookup table including the set of encoding parameters.

In some examples, the set of encoding parameters includes a first parameter indicating a ratio of a total number of bits of the source bit stream to a total number of symbols corresponding to a modulated bit stream, a second parameter indicating a channel encoding rate, a third parameter indicating the distribution matcher parameter, or any combination thereof.

In some examples, the set of encoding parameters includes any pair of the first parameter, the second parameter, or the third parameter.

In some examples, the set of encoding parameters includes an encoding parameter corresponding to a wideband frequency band and an encoding parameter corresponding to a subband frequency band.

In some examples, the configuration indicating the set of encoding parameters includes RRC signaling.

In some examples, the configuration indicating the set of encoding parameters includes DCI signaling or a medium access control control element (MAC-CE) signaling.

In some examples, the distribution matcher corresponds to a constant composition distribution matcher (CCDM) or a prefix-free code distribution matcher (PCDM).

Figure 8:
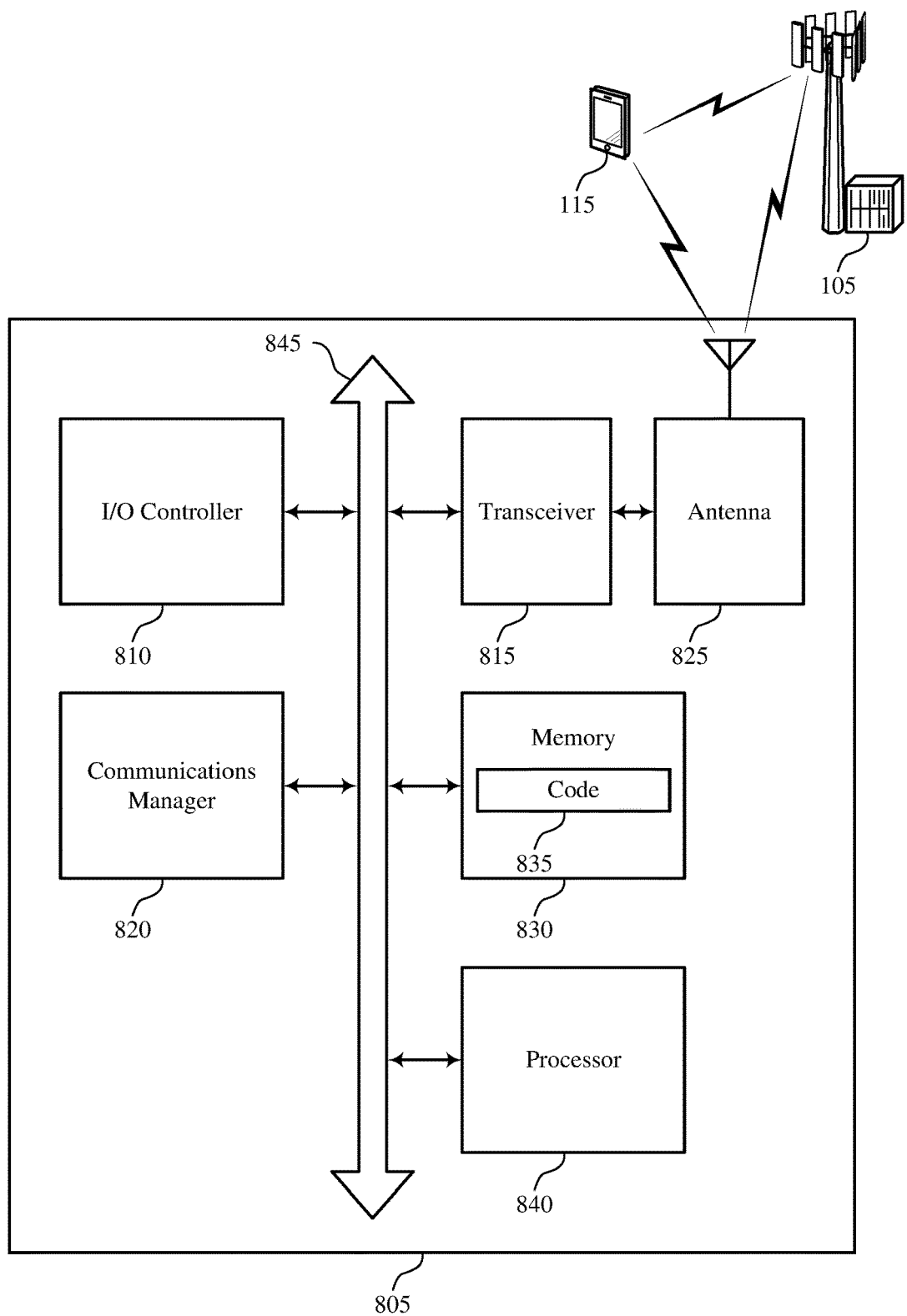
FIG. 8 shows a diagram of a system including a device that supports constellation shaping configuration and feedback in accordance with aspects of the present disclosure.

FIG. 8 shows a diagram of a system 800 including a device 805 that supports constellation shaping configuration and feedback in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting constellation shaping configuration and feedback). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, from a base station, a configuration indicating a set of encoding parameters corresponding to a constellation shaping encoding process. The communications manager 820 may be configured as or otherwise support a means for calculating, based on the set of encoding parameters, a number of bits of a first subset of a source bit stream, where the first subset of the source bit stream includes an input to a distribution matcher of the constellation shaping encoding process. The communications manager 820 may be configured as or otherwise support a means for applying, to the first subset of the source bit stream and at the distribution matcher, a distribution matcher parameter based on the set of encoding parameters. The communications manager 820 may be configured as or otherwise support a means for calculating, based on the set of encoding parameters, a number of bits of a second subset of the source bit stream, where the second subset of the source bit stream is concatenated with an output bit stream of the distribution matcher as an input to a channel encoder. The communications manager 820 may be configured as or otherwise support a means for communicating signaling with the base station including the source bit stream.

By including or configuring the communications manager 820 in accordance with examples as described herein, the device 805 may support techniques for improved communication reliability, reduced latency, and reduced power consumption.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of constellation shaping configuration and feedback as described herein, or the processor 840 and the memory 830 may be otherwise configured to perform or support such operations.

Figure 9:
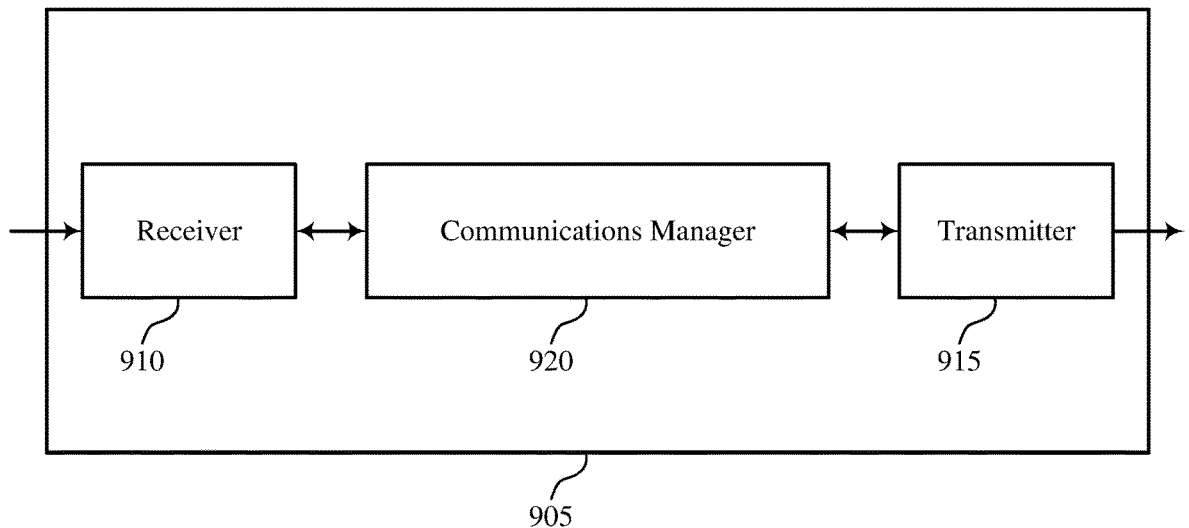
FIGS. 9 and 10 show block diagrams of devices that support constellation shaping configuration and feedback in accordance with aspects of the present disclosure.

FIG. 9 shows a block diagram 900 of a device 905 that supports constellation shaping configuration and feedback in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to constellation shaping configuration and feedback). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to constellation shaping configuration and feedback). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of constellation shaping configuration and feedback as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for transmitting, to a UE, a configuration indicating a set of encoding parameters corresponding to a constellation shaping encoding process, where the set of encoding parameters indicate a number of bits of a first subset of a source bit stream and a number of bits of a second subset of the source bit stream, where the first subset of the source bit stream includes an input to a distribution matcher of the constellation shaping encoding process, and where the second subset of the source bit stream is concatenated with an output bit stream of the distribution matcher as an input to a channel encoder. The communications manager 920 may be configured as or otherwise support a means for communicating signaling with the UE including the source bit stream.

Figure 10:
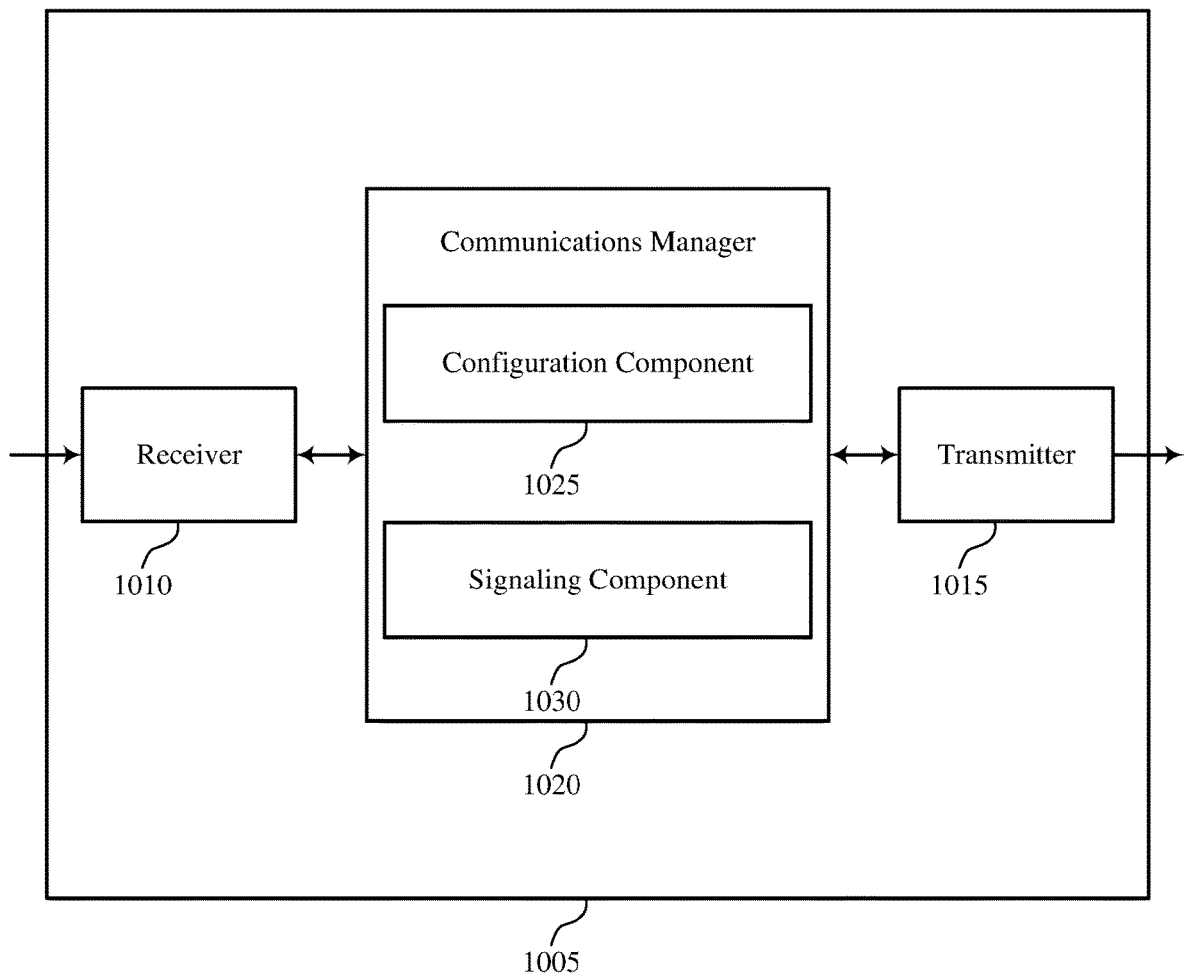

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced power consumption, more efficient utilization of communication resources, and reduced system latency FIG. 10 shows a block diagram 1000 of a device 1005 that supports constellation shaping configuration and feedback in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to constellation shaping configuration and feedback). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to constellation shaping configuration and feedback). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of constellation shaping configuration and feedback as described herein. For example, the communications manager 1020 may include a configuration component 1025 a signaling component 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The configuration component 1025 may be configured as or otherwise support a means for transmitting, to a UE, a configuration indicating a set of encoding parameters corresponding to a constellation shaping encoding process, where the set of encoding parameters indicate a number of bits of a first subset of a source bit stream and a number of bits of a second subset of the source bit stream, where the first subset of the source bit stream includes an input to a distribution matcher of the constellation shaping encoding process, and where the second subset of the source bit stream is concatenated with an output bit stream of the distribution matcher as an input to a channel encoder. The signaling component 1030 may be configured as or otherwise support a means for communicating signaling with the UE including the source bit stream.

Figure 11:
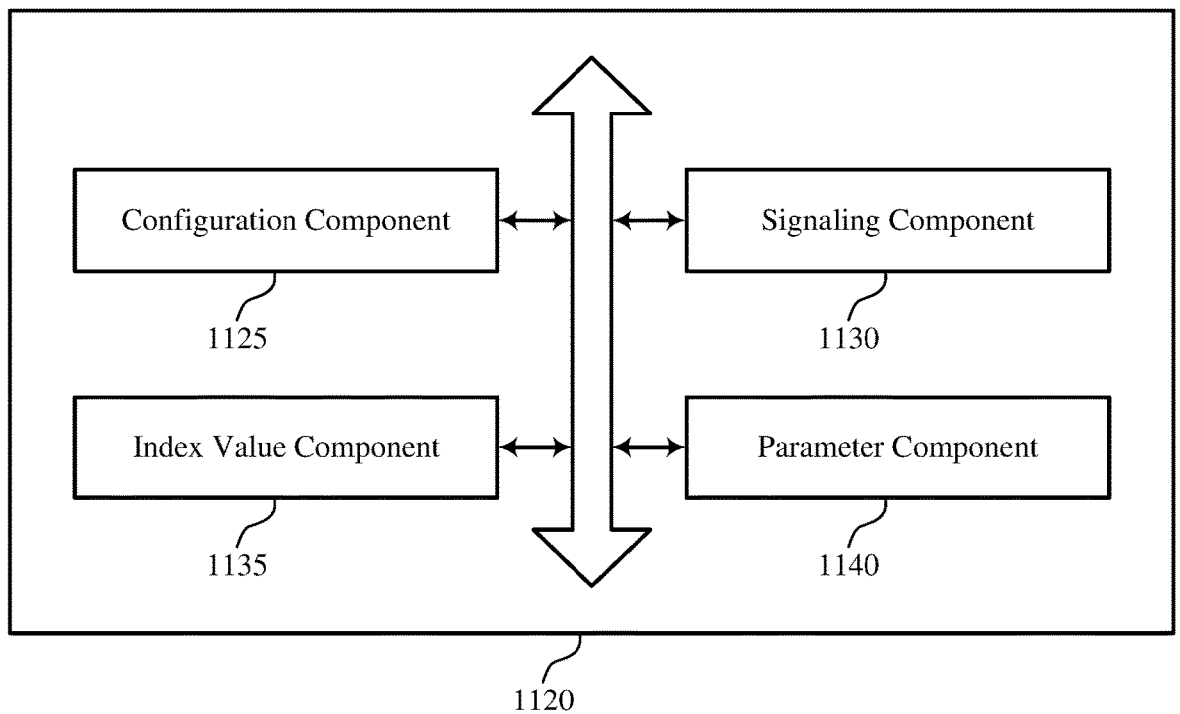
FIG. 11 shows a block diagram of a communications manager that supports constellation shaping configuration and feedback in accordance with aspects of the present disclosure.

FIG. 11 shows a block diagram 1100 of a communications manager 1120 that supports constellation shaping configuration and feedback in accordance with aspects of the present disclosure. The communications manager 1120 may be an example of aspects of a communications manager 920, a communications manager 1020, or both, as described herein. The communications manager 1120, or various components thereof, may be an example of means for performing various aspects of constellation shaping configuration and feedback as described herein. For example, the communications manager 1120 may include a configuration component 1125, a signaling component 1130, an index value component 1135, a parameter component 1140, or any combination thereof. Each of these components may communicate, directly or indirectly, with one another (e.g., via one or more buses).

The communications manager 1120 may support wireless communication at a base station in accordance with examples as disclosed herein. The configuration component 1125 may be configured as or otherwise support a means for transmitting, to a UE, a configuration indicating a set of encoding parameters corresponding to a constellation shaping encoding process, where the set of encoding parameters indicate a number of bits of a first subset of a source bit stream and a number of bits of a second subset of the source bit stream, where the first subset of the source bit stream includes an input to a distribution matcher of the constellation shaping encoding process, and where the second subset of the source bit stream is concatenated with an output bit stream of the distribution matcher as an input to a channel encoder. The signaling component 1130 may be configured as or otherwise support a means for communicating signaling with the UE including the source bit stream.

In some examples, the index value component 1135 may be configured as or otherwise support a means for receiving, from the UE, an indication of an index value corresponding to the set of encoding parameters, where the configuration indicating the set of encoding parameters is based on the indication of the index value.

In some examples, the parameter component 1140 may be configured as or otherwise support a means for receiving, from the UE, an indication of a distribution matcher parameter, where the configuration indicating the set of encoding parameters is based on the indication of the distribution matcher parameter.

In some examples, the configuration component 1125 may be configured as or otherwise support a means for transmitting, to the UE, a message requesting one or more of the set of encoding parameters from the UE.

In some examples, the configuration indicating the set of encoding parameters includes an index to a lookup table including the set of encoding parameters.

In some examples, the set of encoding parameters includes a first parameter indicating a ratio of a total number of bits of the source bit stream to a total number of symbols corresponding to a modulated bit stream, a second parameter indicating a channel encoding rate, a third parameter indicating a distribution matcher parameter, or any combination thereof.

In some examples, the set of encoding parameters includes any pair of the first parameter, the second parameter, or the third parameter. In some examples, the set of encoding parameters includes an encoding parameter corresponding to a wideband frequency band and an encoding parameter corresponding to a subband frequency band.

In some examples, the configuration indicating the set of encoding parameters includes RRC signaling. In some examples, the configuration indicating the set of encoding parameters includes DCI signaling or medium access control control element (MAC-CE) signaling. In some examples, the distribution matcher corresponds to a constant composition distribution matcher (CCDM) or a prefix-free code distribution matcher (PCDM).

Figure 12:
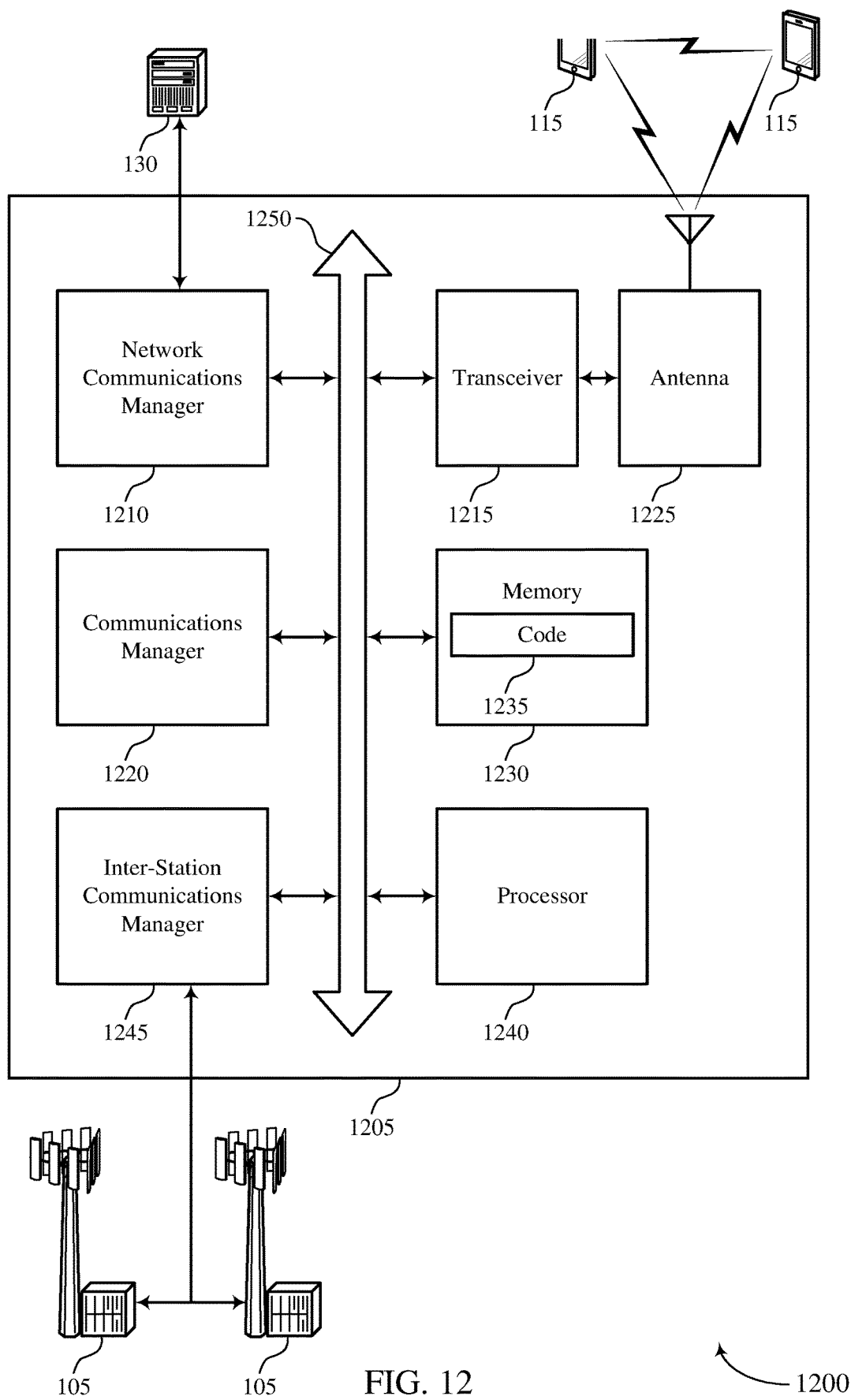
FIG. 12 shows a diagram of a system including a device that supports constellation shaping configuration and feedback in accordance with aspects of the present disclosure.

FIG. 12 shows a diagram of a system 1200 including a device 1205 that supports constellation shaping configuration and feedback in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting constellation shaping configuration and feedback). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for transmitting, to a UE, a configuration indicating a set of encoding parameters corresponding to a constellation shaping encoding process, where the set of encoding parameters indicate a number of bits of a first subset of a source bit stream and a number of bits of a second subset of the source bit stream, where the first subset of the source bit stream includes an input to a distribution matcher of the constellation shaping encoding process, and where the second subset of the source bit stream is concatenated with an output bit stream of the distribution matcher as an input to a channel encoder. The communications manager 1220 may be configured as or otherwise support a means for communicating signaling with the UE including the source bit stream.

By including or configuring the communications manager 1220 in accordance with examples as described herein, the device 1205 may support techniques for improved communication reliability, reduced latency, and reduced power consumption.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of constellation shaping configuration and feedback as described herein, or the processor 1240 and the memory 1230 may be otherwise configured to perform or support such operations.

Figure 13:
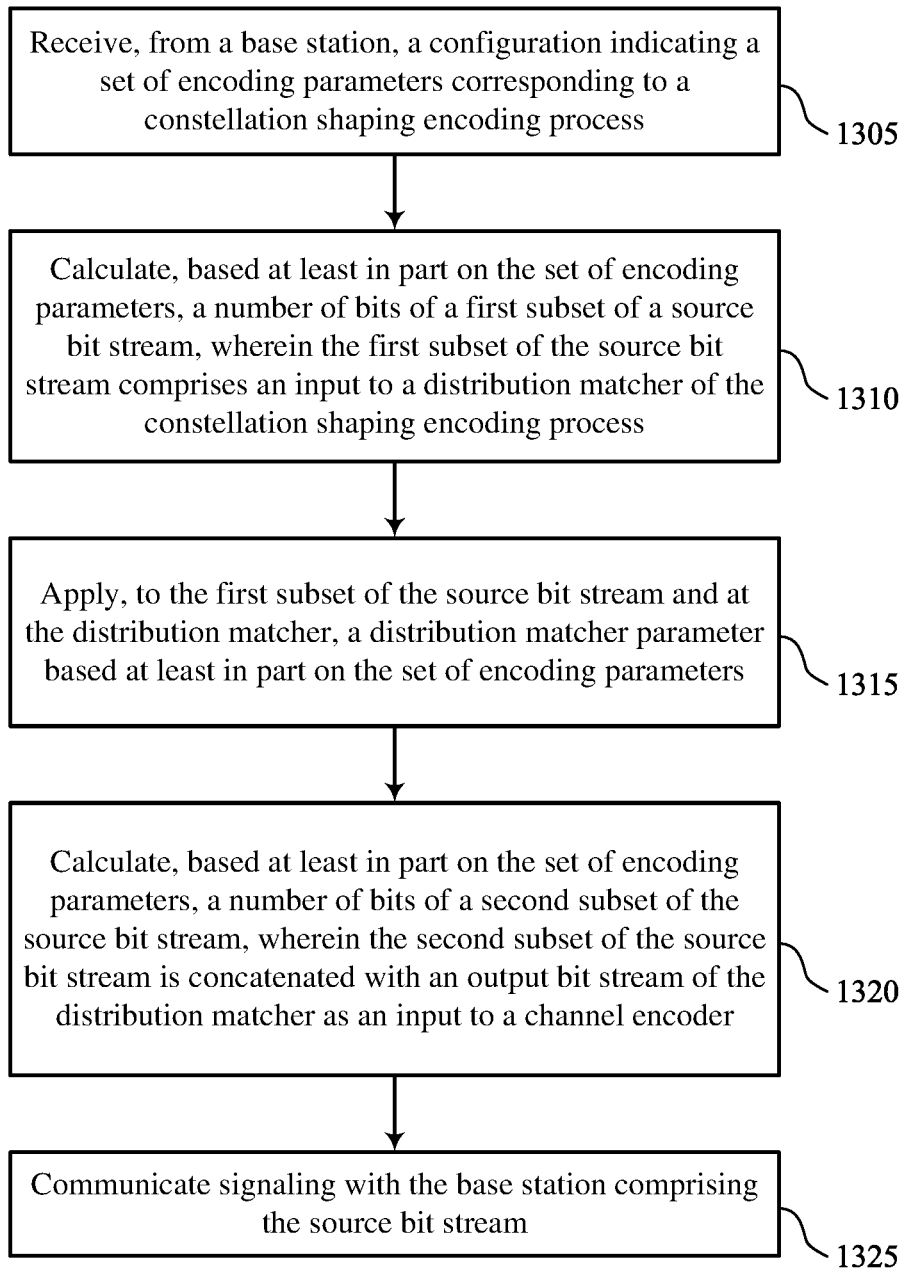
FIGS. 13 through 16 show flowcharts illustrating methods that support constellation shaping configuration and feedback in accordance with aspects of the present disclosure.

FIG. 13 shows a flowchart illustrating a method 1300 that supports constellation shaping configuration and feedback in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a configuration indicating a set of encoding parameters corresponding to a constellation shaping encoding process. The operations of 1305 may be performed in accordance with examples as disclosed herein. In some examples, aspects of the operations of 1305 may be performed by a configuration manager 725 as described with reference to FIG. 7.

At 1310, the method may include calculating, based on the set of encoding parameters, a number of bits of a first subset of a source bit stream, where the first subset of the source bit stream includes an input to a distribution matcher of the constellation shaping encoding process. The operations of 1310 may be performed in accordance with examples as disclosed herein. In some examples, aspects of the operations of 1310 may be performed by a bit stream manager 730 as described with reference to FIG. 7.

At 1315, the method may include applying, to the first subset of the source bit stream and at the distribution matcher, a distribution matcher parameter based on the set of encoding parameters. The operations of 1315 may be performed in accordance with examples as disclosed herein. In some examples, aspects of the operations of 1315 may be performed by a distribution matcher 735 as described with reference to FIG. 7.

At 1320, the method may include calculating, based on the set of encoding parameters, a number of bits of a second subset of the source bit stream, where the second subset of the source bit stream is concatenated with an output bit stream of the distribution matcher as an input to a channel encoder. The operations of 1320 may be performed in accordance with examples as disclosed herein. In some examples, aspects of the operations of 1320 may be performed by a bit stream manager 730 as described with reference to FIG. 7.

At 1325, the method may include communicating signaling with the base station including the source bit stream. The operations of 1325 may be performed in accordance with examples as disclosed herein. In some examples, aspects of the operations of 1325 may be performed by a signaling manager 740 as described with reference to FIG. 7.

Figure 14:
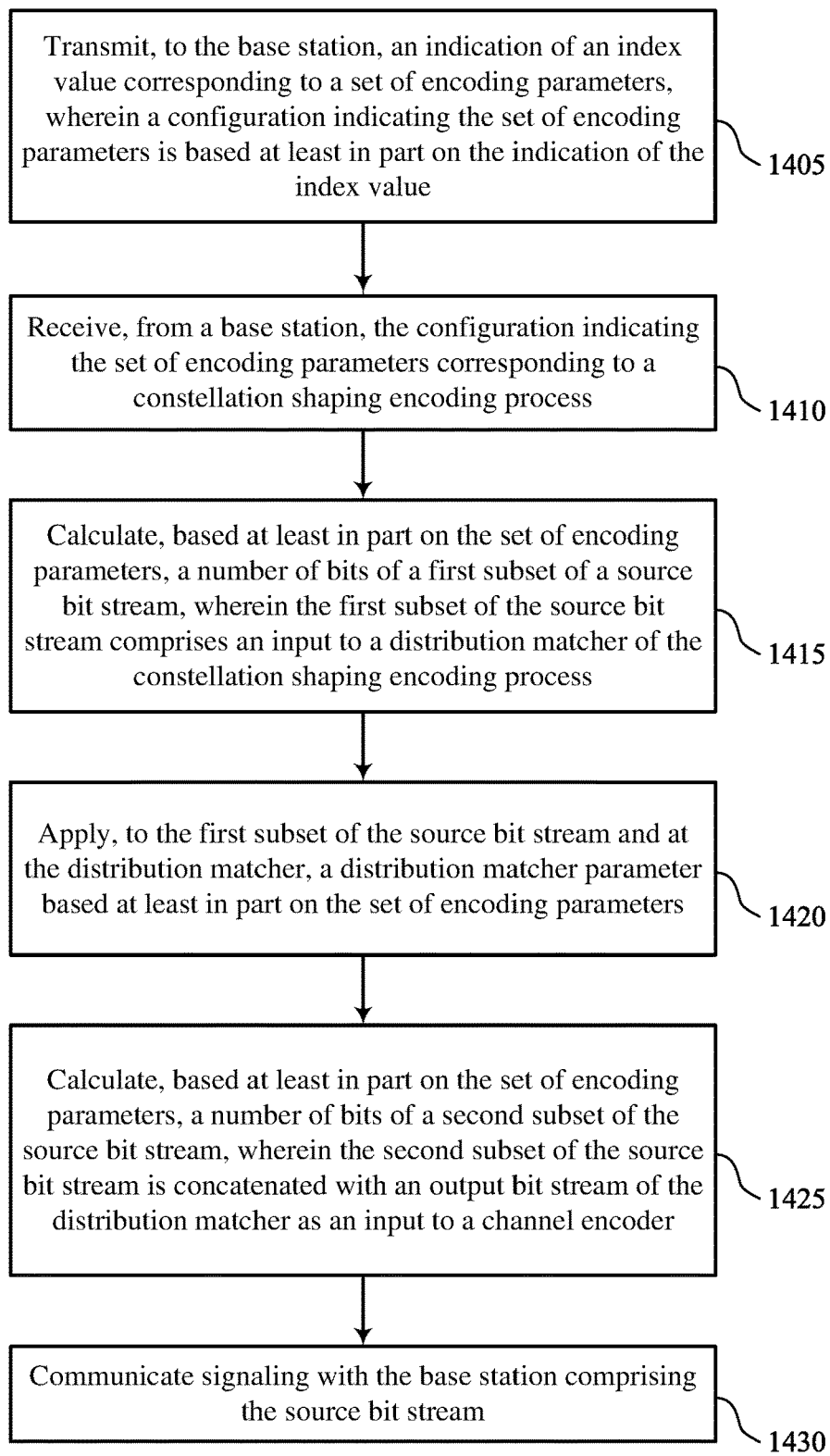

FIG. 14 shows a flowchart illustrating a method 1400 that supports constellation shaping configuration and feedback in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include transmitting, to the base station, an indication of an index value corresponding to a set of encoding parameters, where a configuration indicating the set of encoding parameters is based on the indication of the index value. The operations of 1405 may be performed in accordance with examples as disclosed herein. In some examples, aspects of the operations of 1405 may be performed by an index value manager 745 as described with reference to FIG. 7.

At 1410, the method may include receiving, from a base station, the configuration indicating the set of encoding parameters corresponding to a constellation shaping encoding process. The operations of 1410 may be performed in accordance with examples as disclosed herein. In some examples, aspects of the operations of 1410 may be performed by a configuration manager 725 as described with reference to FIG. 7.

At 1415, the method may include calculating, based on the set of encoding parameters, a number of bits of a first subset of a source bit stream, where the first subset of the source bit stream includes an input to a distribution matcher of the constellation shaping encoding process. The operations of 1415 may be performed in accordance with examples as disclosed herein. In some examples, aspects of the operations of 1415 may be performed by a bit stream manager 730 as described with reference to FIG. 7.

At 1420, the method may include applying, to the first subset of the source bit stream and at the distribution matcher, a distribution matcher parameter based on the set of encoding parameters. The operations of 1420 may be performed in accordance with examples as disclosed herein. In some examples, aspects of the operations of 1420 may be performed by a distribution matcher 735 as described with reference to FIG. 7.

At 1425, the method may include calculating, based on the set of encoding parameters, a number of bits of a second subset of the source bit stream, where the second subset of the source bit stream is concatenated with an output bit stream of the distribution matcher as an input to a channel encoder. The operations of 1425 may be performed in accordance with examples as disclosed herein. In some examples, aspects of the operations of 1425 may be performed by a bit stream manager 730 as described with reference to FIG. 7.

At 1430, the method may include communicating signaling with the base station including the source bit stream. The operations of 1430 may be performed in accordance with examples as disclosed herein. In some examples, aspects of the operations of 1430 may be performed by a signaling manager 740 as described with reference to FIG. 7.

Figure 15:
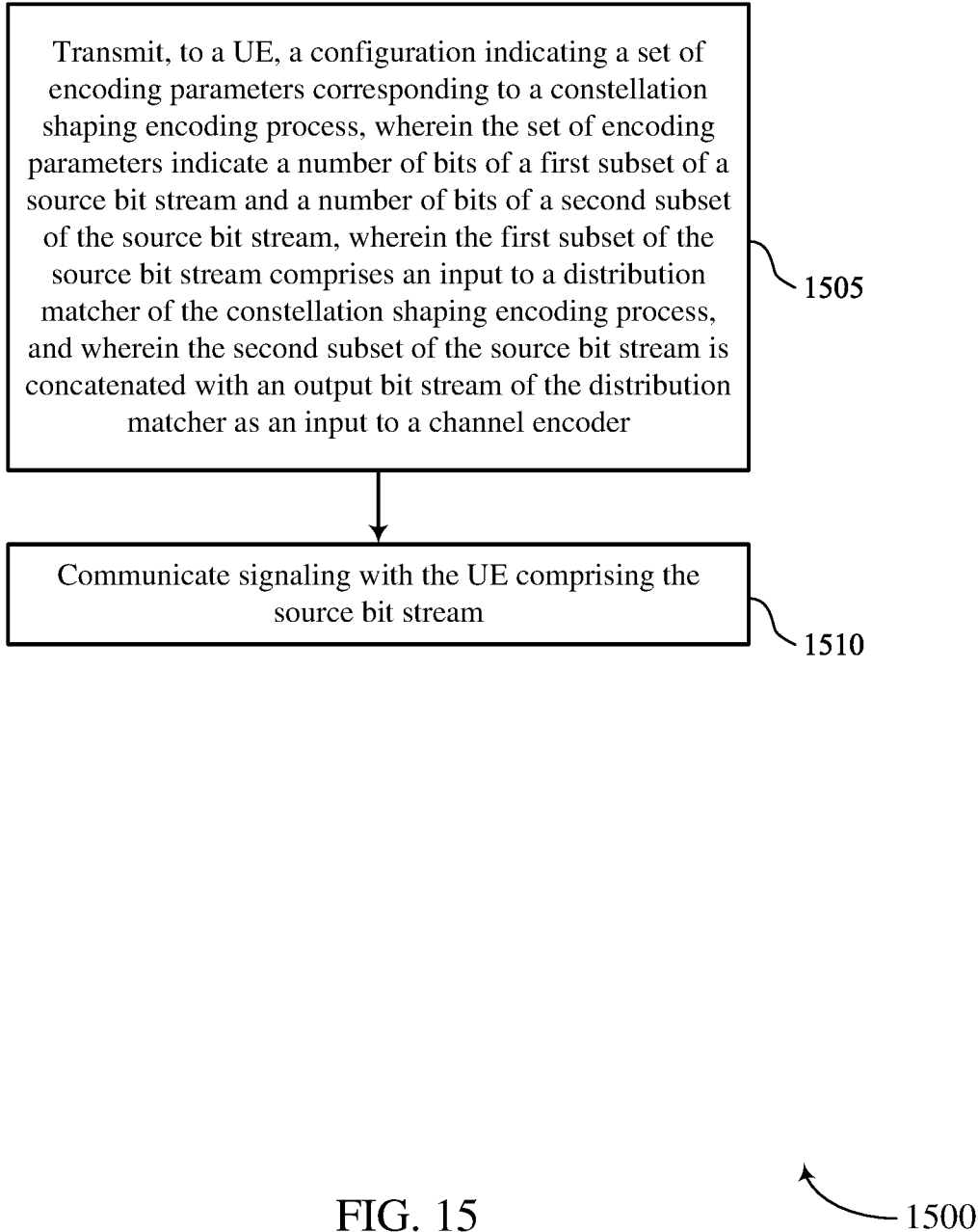

FIG. 15 shows a flowchart illustrating a method 1500 that supports constellation shaping configuration and feedback in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, a configuration indicating a set of encoding parameters corresponding to a constellation shaping encoding process, where the set of encoding parameters indicate a number of bits of a first subset of a source bit stream and a number of bits of a second subset of the source bit stream, where the first subset of the source bit stream includes an input to a distribution matcher of the constellation shaping encoding process, and where the second subset of the source bit stream is concatenated with an output bit stream of the distribution matcher as an input to a channel encoder. The operations of 1505 may be performed in accordance with examples as disclosed herein. In some examples, aspects of the operations of 1505 may be performed by a configuration component 1125 as described with reference to FIG. 11.

At 1510, the method may include communicating signaling with the UE including the source bit stream. The operations of 1510 may be performed in accordance with examples as disclosed herein. In some examples, aspects of the operations of 1510 may be performed by a signaling component 1130 as described with reference to FIG. 11.

Figure 16:
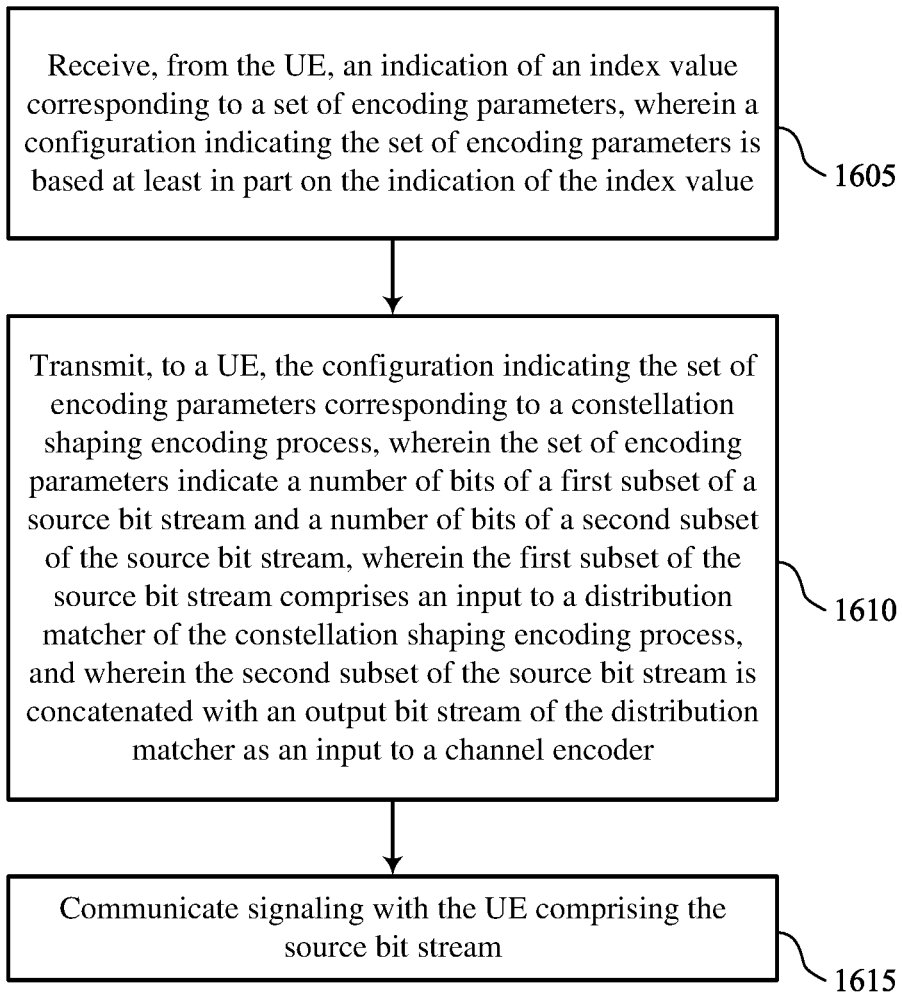

FIG. 16 shows a flowchart illustrating a method 1600 that supports constellation shaping configuration and feedback in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include receiving, from a UE, an indication of an index value corresponding to a set of encoding parameters, where a configuration indicating the set of encoding parameters is based on the indication of the index value. The operations of 1605 may be performed in accordance with examples as disclosed herein. In some examples, aspects of the operations of 1605 may be performed by an index value component 1135 as described with reference to FIG. 11.

At 1610, the method may include transmitting, to a UE, the configuration indicating the set of encoding parameters corresponding to a constellation shaping encoding process, where the set of encoding parameters indicate a number of bits of a first subset of a source bit stream and a number of bits of a second subset of the source bit stream, where the first subset of the source bit stream includes an input to a distribution matcher of the constellation shaping encoding process, and where the second subset of the source bit stream is concatenated with an output bit stream of the distribution matcher as an input to a channel encoder. The operations of 1610 may be performed in accordance with examples as disclosed herein. In some examples, aspects of the operations of 1610 may be performed by a configuration component 1125 as described with reference to FIG. 11.

At 1615, the method may include communicating signaling with the UE including the source bit stream. The operations of 1615 may be performed in accordance with examples as disclosed herein. In some examples, aspects of the operations of 1615 may be performed by a signaling component 1130 as described with reference to FIG. 11.

The following provides an overview of aspects of the present disclosure:

Aspect 1: A method for wireless communication at a user equipment (UE), comprising: receiving, from a base station, a configuration indicating a set of encoding parameters corresponding to a constellation shaping encoding process; calculating, based at least in part on the set of encoding parameters, a number of bits of a first subset of a source bit stream, wherein the first subset of the source bit stream comprises an input to a distribution matcher of the constellation shaping encoding process; applying, to the first subset of the source bit stream and at the distribution matcher, a distribution matcher parameter based at least in part on the set of encoding parameters; calculating, based at least in part on the set of encoding parameters, a number of bits of a second subset of the source bit stream, wherein the second subset of the source bit stream is concatenated with an output bit stream of the distribution matcher as an input to a channel encoder; and communicating signaling with the base station comprising the source bit stream.

Aspect 2: The method of aspect 1, further comprising: transmitting, to the base station, an indication of an index value corresponding to the set of encoding parameters, wherein the configuration indicating the set of encoding parameters is based at least in part on the indication of the index value.

Aspect 3: The method of any of aspects 1 through 2, further comprising: transmitting, to the base station, an indication of the distribution matcher parameter, wherein the configuration indicating the set of encoding parameters is based at least in part on the indication of the distribution matcher parameter.

Aspect 4: The method of any of aspects 1 through 3, further comprising: receiving, from the base station, a message requesting one or more of the set of encoding parameters from the UE.

Aspect 5: The method of any of aspects 1 through 4, wherein the configuration indicating the set of encoding parameters comprises an index to a lookup table comprising the set of encoding parameters.

Aspect 6: The method of any of aspects 1 through 5, wherein the set of encoding parameters comprises a first parameter indicating a ratio of a total number of bits of the source bit stream to a total number of symbols corresponding to a modulated bit stream, a second parameter indicating a channel encoding rate, a third parameter indicating the distribution matcher parameter, or any combination thereof.

Aspect 7: The method of aspect 6, wherein the set of encoding parameters comprises any pair of the first parameter, the second parameter, or the third parameter.

Aspect 8: The method of any of aspects 1 through 7, wherein the set of encoding parameters comprises an encoding parameter corresponding to a wideband frequency band and an encoding parameter corresponding to a subband frequency band.

Aspect 9: The method of any of aspects 1 through 8, wherein the configuration indicating the set of encoding parameters comprises RRC signaling.

Aspect 10: The method of any of aspects 1 through 9, wherein the configuration indicating the set of encoding parameters comprises DCI signaling or a medium access control control element (MAC-CE) signaling.

Aspect 11: The method of any of aspects 1 through 10, wherein the distribution matcher corresponds to a constant composition distribution matcher (CCDM) or a prefix-free code distribution matcher (PCDM).

Aspect 12: A method for wireless communication at a base station, comprising: transmitting, to a UE, a configuration indicating a set of encoding parameters corresponding to a constellation shaping encoding process, wherein the set of encoding parameters indicate a number of bits of a first subset of a source bit stream and a number of bits of a second subset of the source bit stream, wherein the first subset of the source bit stream comprises an input to a distribution matcher of the constellation shaping encoding process, and wherein the second subset of the source bit stream is concatenated with an output bit stream of the distribution matcher as an input to a channel encoder; and communicating signaling with the UE comprising the source bit stream.

Aspect 13: The method of aspect 12, further comprising: receiving, from the UE, an indication of an index value corresponding to the set of encoding parameters, wherein the configuration indicating the set of encoding parameters is based at least in part on the indication of the index value.

Aspect 14: The method of any of aspects 12 through 13, further comprising: receiving, from the UE, an indication of a distribution matcher parameter, wherein the configuration indicating the set of encoding parameters is based at least in part on the indication of the distribution matcher parameter.

Aspect 15: The method of any of aspects 12 through 14, further comprising: transmitting, to the UE, a message requesting one or more of the set of encoding parameters from the UE.

Aspect 16: The method of any of aspects 12 through 15, wherein the configuration indicating the set of encoding parameters comprises an index to a lookup table comprising the set of encoding parameters.

Aspect 17: The method of any of aspects 12 through 16, wherein the set of encoding parameters comprises a first parameter indicating a ratio of a total number of bits of the source bit stream to a total number of symbols corresponding to a modulated bit stream, a second parameter indicating a channel encoding rate, a third parameter indicating a distribution matcher parameter, or any combination thereof.

Aspect 18: The method of aspect 17, wherein the set of encoding parameters comprises any pair of the first parameter, the second parameter, or the third parameter.

Aspect 19: The method of any of aspects 12 through 18, wherein the set of encoding parameters comprises an encoding parameter corresponding to a wideband frequency band and an encoding parameter corresponding to a subband frequency band.

Aspect 20: The method of any of aspects 12 through 19, wherein the configuration indicating the set of encoding parameters comprises RRC signaling.

Aspect 21: The method of any of aspects 12 through 20, wherein the configuration indicating the set of encoding parameters comprises DCI signaling or medium access control control element (MAC-CE) signaling.

Aspect 22: The method of any of aspects 12 through 21, wherein the distribution matcher corresponds to a constant composition distribution matcher (CCDM) or a prefix-free code distribution matcher (PCDM).

Aspect 23: An apparatus for wireless communication at a UE, comprising a processor; memory coupled with the processor; and instructions stored in the memory and executable by the processor to cause the apparatus to perform a method of any of aspects 1 through 11.

Aspect 24: An apparatus for wireless communication at a UE, comprising at least one means for performing a method of any of aspects 1 through 11.

Aspect 25: A non-transitory computer-readable medium storing code for wireless communication at a UE, the code comprising instructions executable by a processor to perform a method of any of aspects 1 through 11.

Aspect 26: An apparatus for wireless communication at a base station, comprising a processor; memory coupled with the processor; and instructions stored in the memory and executable by the processor to cause the apparatus to perform a method of any of aspects 12 through 22.

Aspect 27: An apparatus for wireless communication at a base station, comprising at least one means for performing a method of any of aspects 12 through 22.

Aspect 28: A non-transitory computer-readable medium storing code for wireless communication at a base station, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    receiving, from a base station, a configuration indicating a set of encoding parameters corresponding to a constellation shaping encoding process;
    calculating, based at least in part on the set of encoding parameters, a number of bits of a first subset of a source bit stream, wherein the first subset of the source bit stream comprises an input to a distribution matcher of the constellation shaping encoding process;
    applying, to the first subset of the source bit stream and at the distribution matcher, a distribution matcher parameter based at least in part on the set of encoding parameters;
    calculating, based at least in part on the set of encoding parameters, a number of bits of a second subset of the source bit stream, wherein the second subset of the source bit stream is concatenated with an output bit stream of the distribution matcher as an input to a channel encoder; and
    communicating signaling with the base station comprising the source bit stream; and
    wherein the set of encoding parameters comprises a first parameter indicating a ratio of a total number of bits of the source bit stream to a total number of symbols corresponding to a modulated bit stream, a second parameter indicating a channel encoding rate, and a third parameter indicating the distribution matcher parameter.

2. The method of claim 1, further comprising:
    transmitting, to the base station, an indication of an index value corresponding to the set of encoding parameters, wherein the configuration indicating the set of encoding parameters is based at least in part on the indication of the index value.

3. The method of claim 1, further comprising:
    transmitting, to the base station, an indication of the distribution matcher parameter, wherein the configuration indicating the set of encoding parameters is based at least in part on the indication of the distribution matcher parameter.

4. The method of claim 1, further comprising:
    receiving, from the base station, a message requesting one or more of the set of encoding parameters from the UE.

5. The method of claim 1, wherein the configuration indicating the set of encoding parameters comprises an index to a lookup table comprising the set of encoding parameters.

6. The method of claim 1, wherein the set of encoding parameters comprises any pair of the first parameter, the second parameter, or the third parameter.

7. The method of claim 1, wherein the set of encoding parameters comprises an encoding parameter corresponding to a wideband frequency band and an encoding parameter corresponding to a subband frequency band.

8. The method of claim 1, wherein the configuration indicating the set of encoding parameters comprises radio resource control (RRC) signaling.

9. The method of claim 1, wherein the configuration indicating the set of encoding parameters comprises downlink control information (DCI) signaling or a medium access control control element (MAC-CE) signaling.

10. The method of claim 1, wherein the distribution matcher corresponds to a constant composition distribution matcher (CCDM) or a prefix-free code distribution matcher (PCDM).

11. A method for wireless communication at a base station, comprising:
    transmitting, to a user equipment (UE), a configuration indicating a set of encoding parameters corresponding to a constellation shaping encoding process, wherein the set of encoding parameters indicate a number of bits of a first subset of a source bit stream and a number of bits of a second subset of the source bit stream, wherein the first subset of the source bit stream comprises an input to a distribution matcher of the constellation shaping encoding process, and wherein the second subset of the source bit stream is concatenated with an output bit stream of the distribution matcher as an input to a channel encoder; and communicating signaling with the UE comprising the source bit stream; and wherein the set of encoding parameters comprises a first parameter indicating a ratio of a total number of bits of the source bit stream to a total number of symbols corresponding to a modulated bit stream, a second parameter indicating a channel encoding rate, and a third parameter indicating the distribution matcher parameter.

12. The method of claim 11, further comprising:
receiving, from the UE, an indication of an index value corresponding to the set of encoding parameters, wherein the configuration indicating the set of encoding parameters is based at least in part on the indication of the index value.

13. The method of claim 11, further comprising:
receiving, from the UE, an indication of a distribution matcher parameter, wherein the configuration indicating the set of encoding parameters is based at least in part on the indication of the distribution matcher parameter.

14. The method of claim 11, further comprising:
transmitting, to the UE, a message requesting one or more of the set of encoding parameters from the UE.

15. The method of claim 11, wherein the configuration indicating the set of encoding parameters comprises an index to a lookup table comprising the set of encoding parameters.

16. The method of claim 11, wherein the set of encoding parameters comprises any pair of the first parameter, the second parameter, or the third parameter.

17. The method of claim 11, wherein the set of encoding parameters comprises an encoding parameter corresponding to a wideband frequency band and an encoding parameter corresponding to a subband frequency band.

18. The method of claim 11, wherein the configuration indicating the set of encoding parameters comprises radio resource control (RRC) signaling.

19. The method of claim 11, wherein the configuration indicating the set of encoding parameters comprises downlink control information (DCI) signaling or medium access control control element (MAC-CE) signaling.

20. The method of claim 11, wherein the distribution matcher corresponds to a constant composition distribution matcher (CCDM) or a prefix-free code distribution matcher (PCDM).

21. An apparatus for wireless communication at a user equipment (UE), comprising:
a processor;
memory coupled with the processor; and
instructions stored in the memory and executable by the processor to cause the apparatus to:
receive, from a base station, a configuration indicating a set of encoding parameters corresponding to a constellation shaping encoding process;
calculate, based at least in part on the set of encoding parameters, a number of bits of a first subset of a source bit stream, wherein the first subset of the source bit stream comprises an input to a distribution matcher of the constellation shaping encoding process;

apply, to the first subset of the source bit stream and at the distribution matcher, a distribution matcher parameter based at least in part on the set of encoding parameters;
calculate, based at least in part on the set of encoding parameters, a number of bits of a second subset of the source bit stream, wherein the second subset of the source bit stream is concatenated with an output bit stream of the distribution matcher as an input to a channel encoder; and
communicate signaling with the base station comprising the source bit stream; and
wherein the set of encoding parameters comprises a first parameter indicating a ratio of a total number of bits of the source bit stream to a total number of symbols corresponding to a modulated bit stream, a second parameter indicating a channel encoding rate, and a third parameter indicating the distribution matcher parameter.

22. The apparatus of claim 21, wherein the instructions are further executable by the processor to cause the apparatus to:
transmit, to the base station, an indication of an index value corresponding to the set of encoding parameters, wherein the configuration indicating the set of encoding parameters is based at least in part on the indication of the index value.

23. The apparatus of claim 21, wherein the instructions are further executable by the processor to cause the apparatus to:
transmit, to the base station, an indication of the distribution matcher parameter, wherein the configuration indicating the set of encoding parameters is based at least in part on the indication of the distribution matcher parameter.

24. The apparatus of claim 21, wherein the instructions are further executable by the processor to cause the apparatus to:
receive, from the base station, a message requesting one or more of the set of encoding parameters from the UE.

25. An apparatus for wireless communication at a base station, comprising:
a processor;
memory coupled with the processor; and
instructions stored in the memory and executable by the processor to cause the apparatus to:
transmit, to a user equipment (UE), a configuration indicating a set of encoding parameters corresponding to a constellation shaping encoding process, wherein the set of encoding parameters indicate a number of bits of a first subset of a source bit stream and a number of bits of a second subset of the source bit stream, wherein the first subset of the source bit stream comprises an input to a distribution matcher of the constellation shaping encoding process, and wherein the second subset of the source bit stream is concatenated with an output bit stream of the distribution matcher as an input to a channel encoder; and
communicate signaling with the UE comprising the source bit stream; and
wherein the set of encoding parameters comprises a first parameter indicating a ratio of a total number of bits of the source bit stream to a total number of symbols corresponding to a modulated bit stream, a second parameter indicating a channel encoding rate, and a third parameter indicating the distribution matcher parameter.

26. The apparatus of claim 25, wherein the instructions are further executable by the processor to cause the apparatus to:
   receive, from the UE, an indication of an index value corresponding to the set of encoding parameters, wherein the configuration indicating the set of encoding parameters is based at least in part on the indication of the index value.

27. The apparatus of claim 25, wherein the instructions are further executable by the processor to cause the apparatus to:
   receive, from the UE, an indication of a distribution matcher parameter, wherein the configuration indicating the set of encoding parameters is based at least in part on the indication of the distribution matcher parameter.

28. The apparatus of claim 25, wherein the instructions are further executable by the processor to cause the apparatus to:
   transmit, to the UE, a message requesting one or more of the set of encoding parameters from the UE.

* * * * *